(12) United States Patent
Okubo et al.

(10) Patent No.: US 10,308,516 B2
(45) Date of Patent: Jun. 4, 2019

(54) ZEOLITE PRODUCTION METHOD

(71) Applicants: MITSUBISHI CHEMICAL CORPORATION, Tokyo (JP); THE UNIVERSITY OF TOKYO, Tokyo (JP)

(72) Inventors: Tatsuya Okubo, Tokyo (JP); Toru Wakihara, Tokyo (JP); Zhendong Liu, Tokyo (JP); Takahiko Takewaki, Yokohama (JP); Kazunori Oshima, Yokohama (JP); Daisuke Nishioka, Yokohama (JP)

(73) Assignees: MITSUBISHI CHEMICAL CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 409 days.

(21) Appl. No.: 14/990,431

(22) Filed: Jan. 7, 2016

(65) Prior Publication Data
US 2016/0115039 A1    Apr. 28, 2016

Related U.S. Application Data

(63) Continuation of application No. PCT/JP2014/068369, filed on Jul. 9, 2014.

(30) Foreign Application Priority Data

Jul. 9, 2013    (JP) .................................. 2013-143771
Feb. 25, 2014    (JP) .................................. 2014-033684

(51) Int. Cl.
| | |
|---|---|
| C01B 39/54 | (2006.01) |
| C01B 39/48 | (2006.01) |
| B01J 29/70 | (2006.01) |
| B01J 29/83 | (2006.01) |
| C01B 39/10 | (2006.01) |
| B01J 29/06 | (2006.01) |
| C01B 39/02 | (2006.01) |
| B01J 29/85 | (2006.01) |
| B01J 8/08 | (2006.01) |
| B01J 29/76 | (2006.01) |
| C01B 39/04 | (2006.01) |
| C01B 39/46 | (2006.01) |
| B01J 19/24 | (2006.01) |

(52) U.S. Cl.
CPC ............... *C01B 39/54* (2013.01); *B01J 8/085* (2013.01); *B01J 8/087* (2013.01); *B01J 19/243* (2013.01); *B01J 29/06* (2013.01); *B01J 29/70* (2013.01); *B01J 29/7015* (2013.01); *B01J 29/763* (2013.01); *B01J 29/83* (2013.01); *B01J 29/85* (2013.01); *C01B 39/02* (2013.01); *C01B 39/04* (2013.01); *C01B 39/10* (2013.01); *C01B 39/46* (2013.01); *C01B 39/48* (2013.01); *B01J 2208/00106* (2013.01); *B01J 2208/00168* (2013.01); *B01J 2208/00283* (2013.01); *B01J 2208/00752* (2013.01); *B01J 2208/065* (2013.01); *B01J 2219/00099* (2013.01)

(58) Field of Classification Search
CPC ......... C01B 39/02; C01B 39/10; C01B 39/54; C01B 39/48; B01J 29/70; B01J 29/7015; B01J 29/83; B01J 29/85; B01J 29/06
See application file for complete search history.

(56) References Cited

U.S. PATENT DOCUMENTS

| | | |
|---|---|---|
| 4,303,494 A | 12/1981 | Whitehurst et al. |
| 7,241,713 B2 | 7/2007 | Chang et al. |
| 7,501,375 B2 | 3/2009 | Chang et al. |
| 7,557,256 B2 | 7/2009 | Chang et al. |
| 2001/0054549 A1 | 12/2001 | Park et al. |
| 2005/0065021 A1 | 3/2005 | Chang et al. |
| 2006/0135349 A1 | 6/2006 | Mertens et al. |

(Continued)

FOREIGN PATENT DOCUMENTS

| | | | |
|---|---|---|---|
| CM | 101671035 A | * 3/2010 | ............ C01B 39/14 |
| CN | 1856362 A | 11/2006 | |
| CN | 101054186 A | 10/2007 | |

(Continued)

OTHER PUBLICATIONS

Verified Syntheis of Zeolite Materials, Robson et al, (2001).*
Lu et al, "Continuous-flow Synthesis of Submicron and Nano-zeolites in Capillary Microchannel Reactor", Journal of Inorganic Materials, Dec. 2011; pp. 1304-1308.*

(Continued)

*Primary Examiner* — David M Brunsman
(74) *Attorney, Agent, or Firm* — Leason Ellis LLP

(57) ABSTRACT

Provided is a method for continuous production of zeolite in which a starting material is continuously supplied to a tubular reactor to produce an aluminophosphate zeolite that contains, in the framework structure, at least aluminum atoms and phosphorus atoms or an aluminosilicate zeolite having $5 \leq SiO_2/Al_2O_3 \leq 2000$. The tubular reactor is heated using a heat medium; a ratio (volume)/(lateral surface area) of the volume (inner capacity) to the lateral surface area of the tubular reactor is 0.75 cm or smaller; and seed crystals are added to the starting material. Through using a small-diameter tubular reactor and heating with a heat medium, it becomes possible to heat sufficiently the entirety of a starting material (zeolite precursor gel) in a short time, and to allow reaction to proceed at a high rate. The occurrence of irregular pressure fluctuations during continuous production of the zeolite can be prevented by adding seed crystals.

12 Claims, 12 Drawing Sheets

(56) References Cited

U.S. PATENT DOCUMENTS

2011/0152478 A1    6/2011  Mertens et al.

FOREIGN PATENT DOCUMENTS

| CN | 101084065 A | | 12/2007 | |
|---|---|---|---|---|
| CN | 101524631 A | | 9/2009 | |
| CN | 101525140 A | * | 9/2009 | ............. C01B 39/14 |
| CN | 102655934 A | | 9/2012 | |
| JP | 61-236610 A | | 10/1986 | |
| JP | 06-024734 A | | 2/1994 | |
| JP | 07-187653 A | | 7/1995 | |
| JP | 2002-037622 A | | 2/2002 | |
| JP | 2002-068731 A | | 3/2002 | |
| JP | 2002-137917 A | | 5/2002 | |
| JP | 2002137917 A | * | 5/2002 | |
| JP | 2002-186849 A | | 7/2002 | |
| JP | 2002-193613 A | | 7/2002 | |
| JP | 2007-512941 A | | 5/2007 | |
| JP | 2011-93734 A | | 5/2011 | |
| WO | WO-01/17903 A | | 3/2001 | |

OTHER PUBLICATIONS

Latzel et al., "Synthesis and general *characterisation* of RUB-22: A new micro-porous silicate possessing an interrupted framework structure", *Studies in Surface Science and Catalysis*, Jan. 1, 2007, pp. 199-205, vol. 170.

Extended European Search Report dated Jun. 8, 2016 for the corresponding European Patent Application No. 14823636.7.

Slangen "Zeolite synthesis using rapid heating methods. Towards continuous synthesis: TU Delft Repositories", Oct. 12, 1998, pp. 1-157.

Bonaccorsi, et al., "Influence of process parameters in microwave continuous synthesis of zeolite LTA", *Microporous and Mesoporous Materials*, Oct. 30, 2007, pp. 481-493, vol. 112, No. 1-3, Elsevier Science Publishing, New York, US.

Office Action and Search Report dated Jan. 16, 2017 for the corresponding Chinese Patent Application No. 201480038927.2.

Office Action dated Sep. 14, 2017 for the corresponding Chinese Patent Application No. 201480038927.2.

Yu et al., "Solid Acids and Fine Chemicals", *Chemical Industry Press*, Jun. 2006, pp. 135-138.

Office Action dated Jan. 23, 2018 for the corresponding Japanese Patent Application No. 2015-526388.

Latzel et al., "Synthesis and general characterization of RUB-22: A new micro-porous silicate possessing an interrupted framework structure", *Studies in Surface Science and Catalysis*, Jan. 1, 2007, pp. 199-205, vol. 170.

Pan et al, "Rapid Crystallization of Silicalite Nanocrystals in a Capillary Microreactor", *Chemical Engineering & Technology*, 2009, vol. 32, No. 5, p. 732-737.

Yu et al., "A two-phase segmented microfluidic technique for one-step continuous versatile preparation of zeolites", *Chemical Engineering Journal*, Jan. 11, 2013, pp. 78-85, vol. 219.

M.M.J. Treacy et al., "Proceedings of the 12th International Zeolite Conference III", *Mateirals Research Society Conference Proceedings*, Jul. 5-10, 1998, pp. 1553-1560, Baltimore, Maryland, U.S.A.

International Search Report dated Oct. 7, 2014 for the corresponding PCT Application No. PCT/JP2014/068369.

International Preliminary Report on Patentability and Written Opinion dated Jan. 21, 2016 for the corresponding PCT Application No. PCT/JP2014/068369.

Office Action dated Mar. 28, 2018 for the corresponding Chinese Patent Application No. 201480038927.2.

* cited by examiner

ZEOLITE PRODUCTION METHOD

CROSS-REFERENCE TO RELATED APPLICATION

This is a continuation of International Application PCT/JP2014/068369, filed on Jul. 9, 2014, and designated the U.S., (and claims priority from Japanese Patent Application No. 2013-143771, filed on Jul. 9, 2013, and Japanese Patent Application No. 2014-033684, filed on Feb. 25, 2014) the entire contents of which are incorporated herein by reference.

TECHNICAL FIELD

The present invention relates to a zeolite production method, and more particularly, to a zeolite production method that allows producing stably a highly crystalline zeolite having a comparatively large particle size, in a shorter time than in conventional methods.

BACKGROUND ART

The crystal structure of zeolites manifests itself in the form of porous materials, and hence zeolites are used as molecular sieves that let through only molecules of a specific molecular size. By virtue of the characteristic of enabling selective adsorption and desorption of specific molecules, afforded by zeolites, the latter are used for instance in adsorption-type coolers and air conditioners capable of regulating humidity. Coolers and air conditioners in which zeolites are used are advantageous, for instance, in terms of enabling operation using significantly less energy than conventional coolers and air conditioners, and in terms of enabling operation using waste heat. Applications of zeolites are thus being developed in various fields.

Zeolites have to be produced in large quantities in order to be used in such a wide range of applications. In reality, however, the only methods resorted to in practice involve batch production through charging, into an autoclave, of a zeolite starting material (zeolite precursor gel) (hereafter, materials corresponding to a precursor of a zeolite that is subjected to hydrothermal synthesis may be expressed in brackets as zeolite precursor gel, for easier comprehension; the purpose of this notation, however, is to facilitate understanding by making it easier to distinguish the individual starting materials (aluminum source and so forth), and does not alter the meaning of the basic application); production costs are thus high due to material costs and productivity problems. This is one reason why zeolites are not ubiquitously used, despite the excellent energy efficiency that they afford.

Various methods for producing zeolites continuously have been developed conventionally, for the purpose of enhancing zeolite productivity. For instance, PTL 1 discloses a technique that involves introducing a microwave synthesis method, as a measure for shortening a protracted crystallization process, which is one fundamental problem of hydrothermal synthesis, so that it becomes possible to shorten synthesis time through activation of water and ions in a synthesis solution. This technique allows synthesizing a zeolite within 5 minutes, through heating using microwaves in the range of 60 to 1200 W. This can be combined with an effect of making it possible to shorten the production time through addition of 0 to 20% of a molecular sieve. In a case where microwaves are utilized, however, a material such as a fluororesin has to be unavoidably used as part of the reactor, since microwaves do not pass through metals like stainless steel. Such resin materials were problematic, in terms of safety, in hydrothermal synthesis carried out under high pressure.

As a method for synthesizing a zeolite continuously in a tubular reactor that is heated with a heat medium, NPL 1 discloses an example of continuous synthesis of silicalite through oil bath-heating using a stainless-steel capillary reactor. This method enables continuous synthesis of silicalite, with a retention time of 5.8 minutes, using a stainless-steel capillary reactor heated to 150° C. Synthesis in accordance with this method, however, is problematic in that the particle size of the zeolite that is obtained is small, lying in the range from 10 to 100 nm, and the zeolite is difficult to recover by ordinary solid-liquid separation such as filtration. The obtained zeolite, moreover, comprises a significant amount of amorphous component, which translates into poor crystallinity and low quality.

Further, PTL 2 discloses a method for synthesizing a zeolite continuously in a tubular reactor that is heated with a heat medium. For instance, PTL 2 (paragraphs [0046] and [0047]) discloses the feature of generating turbulence within the tubular reactor, to promote the reaction thereby. The zeolite generation reaction can be efficiently carried out as a result.

Further, NPL 2 illustrates examples of synthesis of A-zeolite, Y-zeolite and silicalite-1 zeolite using a tubular reactor having a diameter of 6 mm, heated in an oil bath. In the case of continuous synthesis of a zeolite using a tubular reactor having a diameter of 3 cm or smaller, as illustrated in NPL 2, the use of continuous synthesis was however limited to zeolites, typified by A-zeolite and Y-zeolite, that crystallize from a low-viscosity starting material mixture (zeolite precursor gel) in which no template is used, or to zeolites, typified by silicalite-1 zeolite, that crystallize from a low-viscosity transparent solution. In terms of ease of crystallization as well, the use of continuous synthesis was limited to, for instance, A-zeolite or Y-zeolite, which are synthesized easily to the extent of not requiring any template, or to silicalite-1 zeolite (MFI-type, framework density $17.91/A^3$) having a high framework density and which can crystallize easily. In cases of zeolite crystallization from a starting material mixture (zeolite precursor gel) comprising aluminum and phosphorus, and cases of zeolite crystallization from an aluminosilicate mixture (zeolite precursor gel) comprising a template, however, there have been no examples of continuous synthesis in a tubular reactor having a diameter of 3 cm or smaller, in accordance with a heating method in which an ordinary heat medium is resorted to, due to the high viscosity of the starting material mixture (zeolite precursor gel).

It is deemed that also zeolites of low framework density, i.e. having large spaces in the crystal, are difficult to synthesize continuously in accordance with the above method, from the viewpoint of crystallization difficulty. As reasons underlying this assertion, it is firstly found that stirring of a starting material (zeolite precursor gel) during hydrothermal synthesis is important, as suggested by PTL 2; accordingly, a zeolite that uses a high-viscosity starting material (zeolite precursor gel) cannot be made. Secondly, it is found that a reaction tube becomes clogged readily when synthesizing the zeolite in a high-viscosity starting material (zeolite precursor gel).

CITATION LIST

Patent Literature

[PTL 1] Japanese Patent Application Publication No. 2002-186849
[PTL 2] Japanese Patent Application Publication No. 2002-137917

Non Patent Literature

[NPL 1] Chem. Eng. Technol. 32(2009), No. 5, 732-737
[NPL 2] Proceedings of the 12th International Zeolite Conference III, (1998), 1553-1560

SUMMARY OF INVENTION

Technical Problem

Studies by the inventors have revealed that a reaction time of several hours is required, and the advantages of continuous production cannot be sufficiently achieved, when producing actually a zeolite in accordance with the method disclosed in PTL 2, in particular when producing an aluminophosphate zeolite comprising, in the framework structure, at least aluminum atoms and phosphorus atoms or an aluminosilicate zeolite having $5 \leq SiO_2/Al_2O_3 \leq 2000$ (molar ratio).

Therefore, it is an object of the present invention to provide a method for continuously producing a zeolite in a tubular reactor, being a method for producing efficiently, in a short time, an aluminophosphate zeolite comprising, in the framework structure, at least aluminum atoms and phosphorus atoms or an aluminosilicate zeolite having $5 \leq SiO_2/Al_2O_3 \leq 2000$ (molar ratio), the zeolite being of high crystallinity and having grown particle size. In the description hereafter, an aluminophosphate zeolite comprising, in the framework structure, at least aluminum atoms and phosphorus atoms or an aluminosilicate zeolite having $5 \leq SiO_2/Al_2O_3 \leq 2000$ (molar ratio) may be referred to simply as "zeolite" for short.

Solution to Problem

As a result of diligent research, the inventors found a hydrothermal synthesis method for producing continuously the "zeolite" in a tubular reactor, being a method that allows producing, in a short time, the "zeolite" that could not be produced through conventional hydrothermal synthesis as disclosed in PTL 1. The inventors found that a "zeolite" of sufficient size, good quality and easy to separate in a subsequent process can be obtained quickly by performing sufficient heating over a short time, rather than through stirring by turbulence, as disclosed in PTL 2. Specifically, the inventors speculated that sufficient heating over a short time can be performed by prescribing specific ranges for the ratio of the volume of the tubular reactor i.e. the amount of starting material that is subjected to synthesis to surface area for heat supply.

Further, it was found that that occurrence of irregular pressure fluctuation during continuous production of the "zeolite" could be prevented by adding, as seed crystals, a "zeolite" of identical type to that of the "zeolite" that is to be produced. This pressure fluctuation is deemed to arise from fluctuation of the solid-liquid phase ratio, due to rapid generation and growth of the "zeolite", and from temporary tube clogging. Accordingly, curtailment of such pressure fluctuation affords a significant improving effect on actual production, for instance in terms of preventing drops in production efficiency of the "zeolite" due to tube clogging, enhancing the quality stability of crystallinity, particle size distribution and so forth of the obtained "zeolite", and increasing energy efficiency by prolonging the life of the tube in the tubular reactor and reducing wall thickness.

Addition of seed crystals renders unlikelier, for instance, the problem of excessively small particles of the obtained "zeolite" due to excessive generation of multiple fine crystals that constitute starting points of crystal growth, and, conversely, also the problem of obtaining a coarse "zeolite", caused by insufficient generation of nuclei as growth starting points, which occur when no seed crystals are added. Addition of the seed crystals elicits thus an effect of improving the particle size distribution of the obtained "zeolite".

Further, the inventors arrived at the finding of synthesizing a zeolite over four stages, specifically (1) stage in which a starting material is dissolved to yield a solution; (2) formation stage of sub-units (hereafter also referred to as "SB units") made up of about 10 units of the basic structure of the zeolite; (3) stage of forming an amorphous material through further growth; and (4) crystallization stage. It was found that the problems of occurrence of high-viscosity lumps, reaction tube clogging and so forth occurred from the SB unit formation stage (2) over to the amorphous material formation stage (3), from among the above four stages. It was further found that the reaction proceeds even when the temperature and pressure in the crystallization stage (4) are lower than in the three prior stages. In the light of the above findings, it was speculated that further addition of a zeolite precursor gel in the amorphous material formation stage (3) would allow preventing clogging of the reaction tube, which occurs when the starting material concentration is increased from the start, and would allow improving the poor synthesis efficiency of the zeolite, arising from a low starting material concentration. It was also found that the crystallization reaction could be conducted at a lower temperature and pressure than in a given previous stage if it was arrived at beyond the amorphous stage and a "zeolite" of high crystallinity could be obtained as a result.

The present invention was perfected on the basis of these findings, the gist of which is summarized below.

[1] A method for continuous production of zeolite, wherein a starting material (zeolite precursor gel) is continuously supplied into a tubular reactor to produce an aluminophosphate zeolite that contains, in the framework structure, at least aluminum atoms and phosphorus atoms or an aluminosilicate zeolite having $5 \leq SiO_2/Al_2O_3 \leq 2000$, wherein the tubular reactor is heated using a heat medium; a ratio (volume)/(lateral surface area) of the volume (inner capacity) to the lateral surface area of the tubular reactor is 0.75 cm or smaller; and seed crystals are added to the starting material (zeolite precursor gel).

[2] The method for continuous production of zeolite according to [1], wherein a template is added to the starting material (zeolite precursor gel).

[3] The method for continuous production of zeolite according to [1] or [2], wherein after heating of the starting material that is supplied to the tubular reactor, a zeolite precursor gel is further added, into the tubular reactor, so as to come into contact with the starting material after heating.

[4] The method for continuous production of zeolite according to any one of [1] to [3], wherein the zeolite structure of the zeolite, as established by IZA, is AFI.

[5] The method for continuous production of zeolite according to any one of [1] to [3], wherein the zeolite structure of the zeolite, as established by IZA, is CHA.

[6] The method for continuous production of zeolite according to any one of [1] to [5], wherein the starting material (zeolite precursor gel) is aged for two hours or longer.

[7] The method for continuous production of zeolite according to any one of [1] to [6], wherein the framework density of the zeolite ranges from 12.0 T/1,000 Å$^3$ to 17.5 T/1,000 Å$^3$.

[8] The method for continuous production of zeolite according to any one of [1] to [7], wherein the zeolite comprises a transition metal.

[9] A method for continuous production of zeolite in which a starting material (zeolite precursor gel) is supplied into a tubular reactor, followed by heating the tubular reactor to produce an aluminophosphate zeolite that contains, in the framework structure, at least aluminum atoms and phosphorus atoms or an aluminosilicate zeolite having $5 \leq SiO_2/Al_2O_3 \leq 2000$ (molar ratio), wherein the diameter of the tubular reactor is set to be equal to or smaller than 3 cm, and seed crystals are added to the starting material (zeolite precursor gel).

[10] The method for continuous production of zeolite according to any one of [1] to [9], wherein the tubular reactor comprises an independent tubular reactor having an openable and closable lid; the starting material (zeolite precursor gel) is supplied to the tubular reactor and the lid is closed; thereafter, the tubular reactor is heated by being placed in a heat medium; and thereafter, the tubular reactor is retrieved from the heat medium, the lid is opened, and a product is retrieved.

[11] The method for continuous production of zeolite according to any one of [1] to [9], wherein the tubular reactor comprises an independent tubular reactor having an openable and closable lid; the starting material is supplied to the tubular reactor and the lid is closed; thereafter, the tubular reactor is heated by being placed in a heat medium; and thereafter, the tubular reactor is retrieved from the heat medium, the lid is opened, a product is retrieved, and the product is kept at a lower temperature than during reaction.

[12] A zeolite production apparatus having at least one or more of a starting material tank, a seed crystal tank, a reflux tank and a tubular reactor, the zeolite production apparatus having: means for merging in appropriate proportions, and supplying to the tubular reactor, a starting material from the starting material tank, seed crystals from the seed crystal tank, and reflux from the reflux tank; a heating tank that holds a heat medium for heating the tubular reactor; means for separating a generated zeolite; and means for returning, to the reflux tank, residual starting material after zeolite separation; wherein a ratio (volume)/(lateral surface area) of the volume (inner capacity) to the lateral surface area of the tubular reactor is 0.75 cm or smaller.

The present invention further encompasses the following gist.

[13] The method for continuous production of zeolite according to [8], wherein the transition metal is one or two or more selected from among copper, iron and tin.

[14] A propylene production method, wherein propylene is produced from ethylene as a starting material, using a zeolite obtained in accordance with the production method of any one of [1] to [11] and [13] as a catalyst.

[15] A method for producing a catalyst for exhaust gas treatment, wherein a zeolite obtained in accordance with the production method of any one of [1] to [11] and [13] is used, as a catalyst, for purification of exhaust gas.

[16] An exhaust gas treatment apparatus wherein a zeolite obtained in accordance with the production method of any one of [1] to [11] and [13] is used as a catalyst.

[17] The method for continuous production of zeolite according to [10] or [11], wherein the tubular reactor is a plurality thereof.

[18] A method for continuous production of zeolite, wherein a starting material (zeolite precursor gel) is continuously supplied to a tubular reactor that is heated using a heat medium to continuously produce an aluminophosphate zeolite that contains at least aluminum atoms and phosphorus atoms in the framework structure or an aluminosilicate zeolite having $5 \leq SiO_2/Al_2O_3 \leq 2000$, wherein the diameter of the tubular reactor is set to be equal to or smaller than 3 cm, and seed crystals are added to the starting material (zeolite precursor gel).

Advantageous Effects of Invention

The present invention allows producing stably and efficiently, in a short time, a "zeolite" of high crystallinity and having grown particle size, through continuous production of an industrially feasible "zeolite".

DESCRIPTION OF EMBODIMENTS

Figure 1:
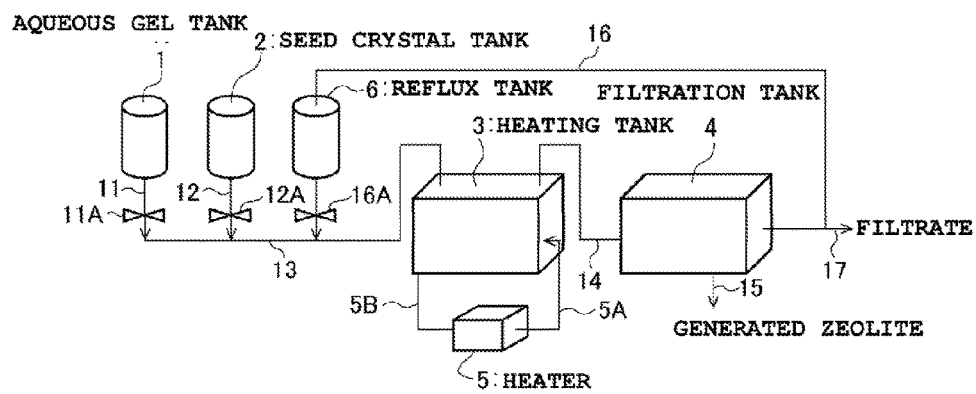
FIG. 1 is a schematic diagram illustrating an example of an apparatus that is used in a production method of a "zeolite" of the present invention.

Embodiments of the present invention will be explained next in detail. The explanation below describes examples (representative examples) of an embodiment of the present invention, but the present invention is not limited to the features of the examples.

The production method of the "zeolite" of the present invention is a method for continuously producing the "zeolite" through continuous supply of starting material (zeolite precursor gel) to a tubular reactor that is heated using a heat medium, the method being characterized in that a ratio (volume)/(lateral surface area) of the volume (inner capacity) to the lateral surface area of the tubular reactor that is used is set to be equal to or smaller than 0.75 cm, and seed crystals are added to the starting material (zeolite precursor gel).

The production method of the "zeolite" of the present invention can be carried out in accordance with an ordinary method, except for the feature of using a tubular reactor having a ratio (volume)/(lateral surface area) of volume (inner capacity) to the lateral surface area of 0.75 cm or smaller (corresponding to having a diameter of 3 cm or smaller in the case of a straight tube), and the feature of adding seed crystals to the starting material (zeolite precursor gel). The "zeolite" is produced herein through hydrothermal synthesis of starting material compounds of atoms that make up the "zeolite", and preferably, of a starting material (zeolite precursor gel) that comprises a template. That is, the starting material (zeolite precursor gel) comprises seed crystals; more preferably, the starting material (zeolite precursor gel) further comprises a template. Prior to hydrothermal synthesis, the starting material (starting material compounds): (hereafter, materials corresponding to the materials of the "zeolite" that are prepared initially in order to produce the "zeolite" of the present invention may be expressed as starting material compounds in brackets, for easier comprehension; the purpose of this notation, however, is to facilitate understanding, and does not alter the meaning of the basic application) that is used to produce the "zeolite" may be subjected to aging.

In the present invention, the term "continuous" encompasses instances of virtually uninterrupted continuity, as well as continuity at regular intervals.

Tubular Reactor

The tubular reactor that is used in the present invention will be explained first.

The tubular reactor used in the present invention is a reactor of tubular shape having an inlet of a starting material (zeolite precursor gel) at one end, and a product outlet at the other end, the tubular reactor being heated by a heat medium. A ratio (volume)/(lateral surface area) of the volume (inner capacity) to the lateral surface area of the tubular reactor is 0.75 cm or smaller, preferably 0.5 cm or smaller, particularly preferably 0.25 cm or smaller, and most preferably 0.13 cm or smaller. The smaller the ratio (volume)/(lateral surface area) of the volume (inner capacity) to the lateral surface area of the tubular reactor, the shorter is the time over which the entirety of the starting material (zeolite precursor gel) can be heated sufficiently, and the faster the reaction can proceed, with little concern of occurrence of problems such as clogging so long as the above ratio is not excessively low. The surface area over which heat is received from the heat medium can be represented using the outer diameter of the tubular reactor. Therefore, this relationship is set to a diameter of 3 cm or less, when expressed as the diameter (outer diameter) of the tube. Since clogging is a phenomenon that occurs inside the tubular reactor, the lower limit of the inner diameter of the tubular reactor is preferably 1 mm or greater, more preferably 2 mm or greater. In a case where the cross-section of the tubular reactor (cross-section perpendicular to the tube axis direction) is not circular, the surface-area equivalent diameter of the cross-section may be taken herein as the diameter.

In one aspect of the present invention, the tubular reactor is a reactor of tubular shape having an inlet of a starting material (zeolite precursor gel) at one end, and a product outlet at the other end, the tubular reactor being heated by a heat medium. The diameter (inner diameter) of the tubular reactor is 3 cm or smaller, preferably 2 cm or smaller, particularly preferably 1 cm or smaller and most preferably 5 mm or smaller. In the present invention, the lower limit of the diameter of the tubular reactor is preferably 1 mm or greater, more preferably 2 mm or greater.

The smaller the diameter of the tubular reactor, the shorter is the time over which the entirety of the starting material (zeolite precursor gel) can be heated sufficiently, and the faster the reaction can proceed, with little concern of occurrence of problems such as clogging so long as the diameter is not excessively small. In a case where the cross-section of the tubular reactor (cross-section perpendicular to the tube axis direction) is not circular, the surface-area equivalent diameter of the cross-section may be taken herein as the diameter.

The essence of the present aspect is the feature of heating the entirety of the starting material (zeolite precursor gel) in a short time. This can be expressed also as a ratio of the inner capacity of the reactor, corresponding to the volume of the starting material (zeolite precursor gel), and the surface area of the tubular reactor for receiving thermal energy from an external heat medium. In a case where the cross-section of the tubular reactor is circular and the inner diameter thereof is d (diameter), the inner capacity is given by $\pi d^2/4 \times$length of the reactor. The surface area of the tubular reactor (the surface area denotes the surface area of the lateral circumferential surface of the reactor) is given by $\pi d \times$length of the reactor. Accordingly, the above ratio obeys ($\pi d^2/4 \times$length of the reactor)/($\pi d \times$length of the reactor)=d/4. As described above, it is found that it suffices to set the diameter (inner diameter) of the tubular reactor to be 3 cm or smaller in order for the reaction to proceed quickly using the tubular reactor. Therefore, the value of d/4 is 0.75 or smaller. More preferably, the value of d/4 is 0.5 or smaller, particularly preferably 0.25 or smaller.

As described above, the essence of the present invention is the feature of heating the entirety of the starting material (zeolite precursor gel) in a short time. This can be expressed also as a ratio of the inner capacity of the reactor, corresponding to the volume of the starting material (zeolite precursor gel), to the surface area of the tubular reactor for receiving thermal energy from an external heat medium. In the present invention, for convenience, the ratio of the inner capacity to the lateral surface area of the tubular reactor may be worked out assuming outer diameter=inner diameter=diameter. In a case where the ratio is calculated assuming outer diameter=inner diameter=diameter, the inner capacity is estimated larger than the actual inner capacity. That is, the ratio of (inner capacity) to (lateral surface area) of the present invention is a higher estimate. Since the thickness of the tubular reactor of the present invention can be reduced, the present invention is not rendered impracticable by determining the ratio of (inner capacity) to (lateral surface area) by assuming outer diameter=inner diameter=diameter. In a case where in the present invention the cross-section of the tubular reactor is circular and there holds inner diameter=outer diameter=diameter, then the inner capacity is $\pi d^2/4 \times$length of the reactor, where d denotes the diameter, and the surface area of the tubular reactor (herein, the surface area denotes the surface area of the lateral circumferential surface of the reactor) is given by $\pi d \times$length of the reactor. Accordingly, the above ratio obeys ($\pi d^2/4 \times$length of the reactor)/($\pi d \times$length of the reactor)=d/4 (cm). The inventors have found that the zeolite generation reaction can be caused to proceed quickly, using the tubular reactor, by setting the diameter of the tubular reactor to be equal to or smaller than 3 cm. The value d/4 (cm) of the diameter of the tubular reactor is 0.75 cm in a case where the diameter of the tubular reactor is 3 cm. That is, the ratio d/4 of the (inner capacity) and the (lateral surface area) is 0.75 or smaller, since the ratio is 0.75 cm when the wall thickness is zero. More preferably, d/4 (cm) is 0.5 cm or smaller, and particularly preferably 0.25 cm or smaller. Preferably, d/4 (cm) is 0.025 cm or greater, more preferably 0.05 cm or greater.

By virtue of this definition, a condition can be easily determined that allows producing a zeolite in a short time, even when the cross-section of the tubular reactor is of irregular shape deviating from circular. In a conceivable example of a tubular reactor having a square-tube shape being a rectangle having a length a and a width 2a, the surface area is (6a×length of the reactor) with respect to an inner capacity of (2a×a×length of the reactor). Therefore, it suffices to set the inner capacity/surface area=a/3 to be 0.75 cm or smaller in order to bring the ratio to be equal to or smaller than 0.75, and, accordingly, it suffices to set a to be equal to or smaller than 2.25 cm.

In another conception of the present invention, the "zeolite" starting material (zeolite precursor gel) that is subjected to a reaction comprises seed crystals, the entire tubular reactor can be heated in a short time, and a "zeolite" can be produced continuously in a short time, through the use of a tubular reactor in which a shortest distance between the reactor inner wall and all seed crystals present inside the tubular reactor (perpendicular length from the seed crystals to the reactor inner wall) is no greater than 1.5 cm. The distance is more preferably 1 cm or smaller, yet more preferably 0.5 cm or smaller. The seed crystals in the explanation herein may be regarded as the starting material (zeolite precursor gel), since the seed crystals are dispersed in the starting material (zeolite precursor gel).

The wall thickness of the tubular reactor is preferably set to be not smaller than a given thickness, in order to preserve the strength of the tubular reactor. On the other hand, the wall thickness is preferably small, in order to reduce the amount of thermal energy that is devoted to heat the tubular reactor itself. Therefore, the wall thickness of the tubular reactor ranges preferably from 0.2 mm to 5 mm. The suppression effect on pressure fluctuation in the tubular reactor derived from using seed crystals is advantageous, in the present invention, in terms of making it possible to increase heating efficiency through a reduction in the wall thickness of the tubular reactor.

The length of the tubular reactor is not particularly limited, and a length may be designed such that a reaction time necessary to produce the "zeolite" can be secured as a retention time. The length of the tubular reactor is ordinarily 5 cm or greater, preferably 10 cm or greater, with an upper limit being ordinarily 10 m or smaller, preferably 5 m or smaller. The length of the tubular reactor is 5 times or more, particularly preferably 50 times or more, the diameter of the tubular reactor, with an upper limit being preferably 5000 times or less, particularly preferably 3000 times or less. The tubular reactor, however, may be designed to a length that exceeds the above upper limits. In this case, the temperature and so forth can be stabilized by increasing the heat capacity of a below-described heating tank over the lapse of time during which the product of the complete reaction is flowing through the tubular reactor. In a case where, in particular, the diameter of the tubular reactor is 10 mm or smaller, the length of the tubular reactor is preferably set to be equal to or smaller than 5 m, more preferably equal to or smaller than 3 m, since this allows reducing significantly the risk of reactor clogging.

Such small-diameter elongate tubular reactors are ordinarily used wound in the form of a coil. When the tubular reactor has portions in which the direction of flow of the starting material that passes through the interior of the tubular reactor extends in a direction against gravity, such portions become easily clogged; therefore, the coil-winding plane is more preferably set to be close to horizontal, such that material flow runs from top to bottom.

The material of the tubular reactor is not particularly limited. A material that has heat resistance at the reaction temperature, is not problematic in terms of contamination of the "zeolite", and exhibits good heat conduction is preferably used herein, particularly preferably stainless steel. Copper or aluminum as well, which exhibit good heat conduction, can be used as the material of the reactor, through lining of the interior of the reactor with a stable material such as Teflon (registered trademark) or the like, to prevent contamination of the "zeolite".

In the present invention such a tubular reactor is heated using a heat medium. The term heat medium denotes generically a medium that is used to move heat between an external heat source and an apparatus, in order to control the temperature of the apparatus to a target temperature, through heating of the apparatus. Herein there is used a heat medium having large heat capacity per unit volume and a high heat-transfer coefficient, and which does not corrode the apparatus, the heat medium being moreover suitable in environmental and economic terms. For instance, oil, steam, a metal block or the like can be used as the heat medium. The heat medium may be air in a heater of air convection type. Among the foregoing, a liquid heating medium is particularly preferable in terms of flowability and large heat capacity. Particularly preferred herein are various types of oil. The tubular reactor can be heated uniformly and efficiently through heating of the tubular reactor using thus a heat medium. By contrast, in a case where instead of using a heat medium a heater or the like is used that radiates electromagnetic waves, for instance microwaves, it is difficult to heat the entire length of the elongate reactor to a uniform temperature, and a "zeolite" of high crystallinity cannot be obtained.

In the present invention, the "zeolite" is produced continuously through heating of the starting material (zeolite precursor gel) for producing the "zeolite" while causing the starting material (zeolite precursor gel) to circulate through the interior of the tubular reactor that is heated by such a heat medium. The flow rate (velocity of circulation) of the starting material (zeolite precursor gel) varies depending on the size and, in particular, the length of the reactor, but is preferably 0.5 ml/min or higher, more preferably 1 ml/min or higher, with an upper limit of 500 ml/min or lower, more preferably 100 ml/min or lower. The retention time (reaction time) of the starting material (zeolite precursor gel) inside the tubular reactor is preferably 0.5 minutes or more, particularly preferably 0.8 minutes or more, and most preferably 1 minute or more. The upper limit is preferably 60 minutes or less, particularly preferably 13 minutes or less, and most preferably 3 minutes or less.

A retention time (reaction time) lying within the above ranges is preferred since in that case the "zeolite" can be obtained easily and stably, in a significantly shorter time than in conventional instances, with good yield and to a sufficient size. The retention time in the tubular reactor may exceed the above upper limit. The velocity of circulation need not be kept constantly fixed, and circulation may be intermittent. In that case, the average value during circulation through the tubular reactor may be regarded as the flow rate. In one aspect of the present invention, starting material is added, in the course of the reaction, so as to come into contact with the starting material after heating has already started, for the purpose of viscosity control and in order to enhance yield per unit time. In this case, the time and flow rate may be regarded as the time elapsed up to addition of the starting material so as to elicit contact.

By enhancing in the present invention the heating efficiency through the use of the heat medium and of a tubular reactor having a small diameter i.e. having a large surface area with respect to volume, as described above, it becomes possible to shorten the reaction time, and to produce a "zeolite" in such a short time as could not have been anticipated by a researcher in the conventional art, for instance involving a velocity of circulation and a reaction time such as those described above.

The reaction temperature, i.e. the heating temperature of the tubular reactor may be comparable to the temperature of hydrothermal synthesis of ordinary zeolites; the lower limit value of the reaction temperature is ordinarily 100° C. or higher, preferably 120° C. or higher, and more preferably 150° C. or higher. The upper limit is 300° C. or lower, preferably 250° C. or lower, more preferably 220° C. or lower, and the heating temperature ranges particularly preferably from 160° C. to 200° C. The heating temperature is adjusted by way of the temperature of the heat medium.

In order to heat the tubular reactor efficiently in a short time, it is preferable to adjust the amount of the heat medium to an appropriate value with respect to the size of the tubular reactor. The use amount of the heat medium varies depending on the type of the heat medium that is utilized, but a heat medium involved in heating of a tubular reactor i.e. a heat medium 8 within a heating tank 3 in the apparatus of FIG. 1 and FIG. 2 described below is preferably used in a proportion set to 0.5 times by volume or more, particularly preferably 1 times by volume or more, and 5000 times by volume or less, particularly preferably 1000 times by volume or less, with respect to the effective volume of the tubular reactor (volume of the interior of the reactor). The amount of heat medium is ordinarily larger than that of the heated starting material (zeolite precursor gel). This is preferable in order to transfer thermal energy quickly to the starting material (zeolite precursor gel). However, energy is required in order to heat the heat medium, and, accordingly, it is preferable to rely for instance on a structure such as that of a double tube-type heat exchanger, since in that case the amount of heat medium can be made very small. Preferably, the entirety of the tubular reactor is present within the heat medium during the synthesis reaction of the "zeolite".

The pressure during the reaction may be autogenous pressure similar to that of ordinary hydrothermal synthesis. More preferably, the pressure is controlled to lie within a range of 1 to 1.5 times the water steam pressure at that temperature.

A pressure lying within the above ranges enables a more stable operation, through prevention of discontinuous jetting of a gas component generated by decomposition of starting material compounds, and through prevention of partial flow path clogging by a solid (high-viscosity mass), which may occur when the pressure is lower than the above ranges.

Preferably, the pressure is set to be smaller than the above-described upper limit value, for reasons of safety.

A "zeolite" of high crystallinity, comparatively large particle size, and good particle size distribution can be produced continuously, in a short time and efficiently, in accordance with the method for producing a "zeolite" of the present invention through reaction of a starting material (zeolite precursor gel) for producing a "zeolite" and that comprises a seed crystal, as described below, using a tubular reactor that is heated by such a heat medium.

In order to obtain the "zeolite" in large amounts while preventing clogging of the tubular reactor, as described above, it is preferable to supplementarily add the starting material (zeolite precursor gel) to the heated starting material, i.e. to an intermediate product in the course of the reaction. Preferably, thus, a tube for additional supply of the starting material (zeolite precursor gel) is connected to halfway the tubular reactor, to add the starting material (zeolite precursor gel) so as to come into contact with the starting material after heating. The concentration of the starting material (zeolite precursor gel) that is added in the course of the reaction is not particularly limited, so long as the viscosity of the starting material is lower than that of the starting material that is made into SB units or that is brought to an amorphous state in the course of the reaction. The starting material (zeolite precursor gel) that is additionally supplied may be an aqueous gel comprising no seed crystals, but preferably there is used a starting material that is identical to the starting material (zeolite precursor gel) that is supplied to the tubular reactor. Herein, addition so as to elicit contact with the starting material after heating does not denote simply continuous supply of starting material, but addition to the starting material in the form of SB units and/or in an amorphous state in the course of the reaction. Specifically, the above addition denotes addition to an intermediate product in a state where the viscosity of the intermediate product has been increased with respect to that of the starting-material zeolite precursor gel. As a result, the effects are achieved that are both enhancing growth of the "zeolite" and lowering of the viscosity.

As another aspect of the present invention, the reaction is conducted, up to an amorphous state, in a tubular reactor having the characterizing feature described above, i.e. a ratio (volume)/(lateral surface area) of the volume (inner capacity) to lateral surface area of the tubular reactor of 0.75 cm or smaller, after which the zeolite is retrieved and placed under pressure and at a temperature lower than the heating temperature in the tubular reactor. A "zeolite" of high crystallinity can be produced as a result. The solution that comprises the amorphous-state zeolite retrieved from the tubular reactor (also referred to as "intermediate solution" in the present description) may be kept in a state of lower temperature and pressure than those in the tubular reactor, ordinarily at a temperature of 180° C. or lower, preferably 160° C. or lower, and particularly preferably 100° C. or lower. A significant effect of the embodiment of the present invention is that a zeolite of high crystallinity is obtained under conditions at 100° C. or below, i.e. under atmospheric conditions requiring no pressurization (1 atm.). The lower limit value of the holding temperature is preferably 70° C. or higher, more preferably 80° C. or higher, and the holding time is preferably 10 hours or longer, more preferably 1 day or longer, from the viewpoint of enhancing crystallinity. The holding time may be optimized as appropriate depending on the proportion of the starting material that is added in the course of the reaction, and depending on the position at which the starting material is added. Resorting to this production method is advantageous in that the length of the tubular reactor can be shortened and equipment made yet more compact. Further, the zeolite can be produced continuously through charging of new starting material into the tubular reactor, after product retrieval. Producing thus a zeolite continuously is also advantageous in that the amount of heat required for heating may be small, since the starting material is charged to a warmed tubular reactor.

The degree of crystallinity of the "zeolite" produced in the present invention, measured in accordance with the method described in the examples below, is ordinarily 75% or higher, more preferably 80% or higher, and the average particle size before template removal, as measured in accordance with the method described in the examples below, is preferably 0.1 μm or greater, more preferably 1 μm or greater, and particularly preferably 2 μm or greater. The upper limit of average particle size is not particularly limited, but is preferably 100 μm or smaller, more preferably 50 μm or smaller.

The product that flows out through the outlet of the tubular reactor is a slurry that comprises such generated "zeolite". The slurry is subjected to solid-liquid separation, and, as needed, water washing and drying, and also, for instance, firing or the like as needed, to remove the template and render the product ready to use.

Solid-liquid separation of the "zeolite" from the product slurry can be carried out easily, for instance by filtration or precipitation, since the particle size of the "zeolite" produced in the present invention is comparatively large.

Zeolite Production Apparatus

An example of the production apparatus of a "zeolite" used in a zeolite production method of the present invention will be explained next with reference to FIG. 1 to FIG. 3. The apparatus that can be used in the present invention is not limited to any one of the apparatuses illustrated in any of FIG. 1 to FIG. 3.

In the apparatus illustrated in FIG. 1, an aqueous gel from an aqueous gel tank 1 and seed crystals from a seed crystal tank 2 pass through pipes 11, 12 respectively, and through a pipe 13, to generate a zeolite precursor gel that is then introduced into a tubular reactor 3A inside a heating tank 3 (the tubular reactor 3A inside the heating tank 3 is not depicted in FIG. 1). A reaction product from the tubular reactor 3A passes through a pipe 14 and is introduced to a filtration tank 4, where the generated "zeolite" is filtered off. The filtrate is discharged out of the system via a pipe 17, or alternatively, part or the entirety of the filtrate is refluxed by a pipe 16 towards the inlet of the tubular reactor 3A, via a reflux tank 6, for the purpose of recovery and re-utilization of unreacted material. A heating tank such as an oil bath or the like holding a heat medium 8 that heats up the tubular reactor 3A is used herein as the heating tank 3, as illustrated in FIG. 2. The reference symbol 5 denotes a heater for heating the heat medium 8 the purpose of whereof is heating the tubular reactor 3A. The heat medium withdrawn from the heating tank 3 via a pipe 5B is heated and is returned to the heating tank 3 via a pipe 5A. The heat medium 8 in the heating tank 3 is heated thus by the external heater 5, and can be heated also by a heating means that is directly attached to the heating tank 3. A mixing tank for mixing the aqueous gel from the aqueous gel tank 1, the seed crystals from the seed crystal tank 2 and also the unreacted material that is refluxed as needed may be further provided before the heating tank 3. The reference symbols 11A, 12A, 16A in FIG. 1 denote opening-closing valves. For instance, a configuration may be resorted to wherein the seed crystals from the seed crystal tank 2 are supplied to the aqueous gel tank 1, to yield a zeolite precursor.

Figure 2:
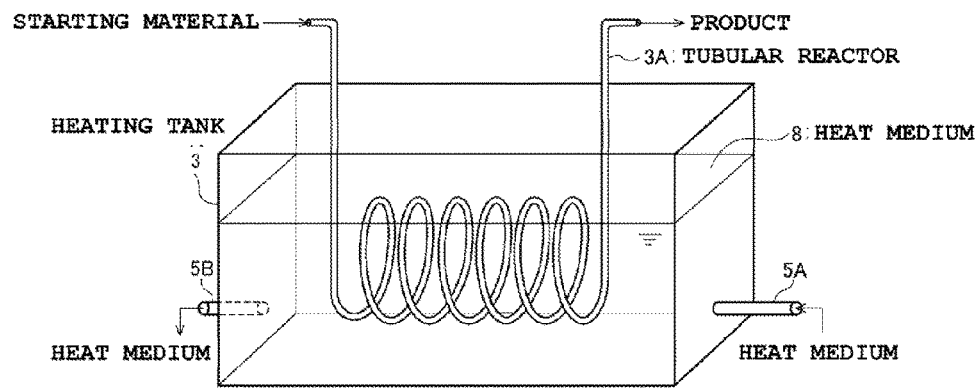
FIG. 2 is a schematic diagram illustrating a tubular reactor portion of the apparatus of FIG. 1.

The tubular reactor 3A illustrated in FIG. 2 is wound in the form of a coil having a circular coil portion. The coil portion may however be wound in the form of a square shape, or may be zig-zag shaped. The tubular reactor 3A may be straight-shaped. Further, multiple tubular reactors 3A may be disposed substantially parallelly to each other, with the portions after the hydrothermal reaction has taken place merged into a single tubular reactor; conversely, the portions before the hydrothermal reaction may be thick, with the outer diameter of only those portions at which the hydrothermal reaction is carried out being equal to or smaller than 3 cm.

Figure 3:
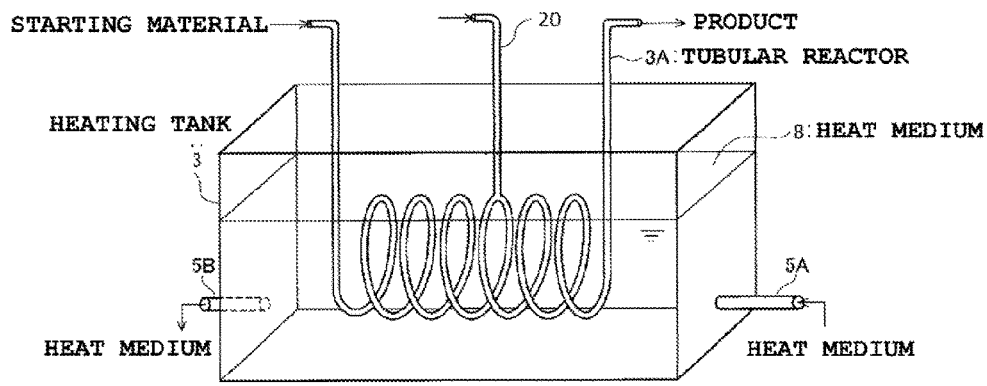
FIG. 3 is a schematic diagram illustrating an example of a tubular reactor portion suitable for a case where a zeolite precursor gel is further added to a starting material after the starting material has been heated in a tubular reactor.

In the apparatus illustrated in FIG. 1 to FIG. 3, the aqueous gel (starting material mixture) from the aqueous gel tank 1 and the seed crystals from the seed crystal tank 2 are supplied, at respective predetermined proportions, to the tubular reactor 3A. The "zeolite" starting material (zeolite precursor gel) of the aqueous gel having had the seed crystals added thereto undergoes hydrothermal synthesis while flowing through the tubular reactor 3A that is heated by the heat medium 8.

The reaction product comprising the "zeolite" generated in the hydrothermal synthesis is next subjected to solid-liquid separation in the filtration tank 4, and the generated zeolite is recovered.

Part or the entirety of the filtrate is refluxed to the tubular reactor 3A via the reflux tank 6, to undergo hydrothermal synthesis once more. As a result, it becomes possible to recover and re-use the unreacted material, and to increase thus the yield of the "zeolite". In the case of an apparatus of a type where the starting material is added in the course of the reaction in such a way so as to come into contact with the starting material after heating, it is preferable to use an apparatus that is provided with a pipe 20 that enables confluence of the additional starting material to halfway in the tubular reactor, as illustrated in FIG. 3.

FIG. 1 to FIG. 3 illustrate a production apparatus of a type in which the "zeolite" is generated as a result of the flow of the starting material (zeolite precursor gel) through the interior of the tubular reactor 3A, but the desired "zeolite" can be produced continuously in accordance with another continuous method, for instance a method that involves preparing multiple short tubular reactors with lids, packing the tubular reactors with the starting material (zeolite precursor gel), closing the lids, and heating thereafter the starting material (zeolite precursor gel) by immersing the tubular reactors one after the other in a heat medium, retrieving then the reactors, having been heated for a predetermined period of time, out of the heat medium, opening the lids and retrieving the contents, and separating the reacted "zeolite" from the unreacted material through solid-liquid separation such as filtration. Production of the "zeolite" by relying on that type of method allows avoiding problems such as tube clogging, and allows further shortening the reaction time by reducing the inner diameter of the tubular reactors. In cases of switching between numerous product types, for instance as in high-mix low-volume production of different zeolite types (not limited to the "zeolite" of the present invention) in a same apparatus, this method in which short tubular reactors are utilized is preferable, since in this case, for instance, type-dedicated tubular reactors can be prepared for respective zeolite types, the tubular reactors are easy to wash, and other various types of zeolite can be produced, in other tubular reactors, during cleaning of tubular reactors having already been used. When resorting to this method, the length of the tubular reactor is preferably 5 cm or greater, in terms of efficiency, and 1 m or shorter, in terms of handling. Other various conditions, such as the size and so forth of the tubular reactor, temperature, reaction time, the seed crystals that are used and the heating tank are identical to those of an instance where the starting material (zeolite precursor gel) flows through a tubular reactor. Needless to say, a zeolite of high crystallinity can be produced by conducting hydrothermal synthesis in the tubular reactor up to a SB unit formation stage, and thereafter, retrieving the intermediate product of a SB unit formation stage as described above and keeping it at a lower temperature and under lower pressure than during the hydrothermal reaction.

Zeolite

A preferred zeolite produced in the present invention will be explained next.

The zeolite produced in the present invention (also referred to hereafter as the "zeolite" of the present invention) is advantageously used in a wide range of applications, for instance adsorption-type coolers and air conditioners, and various types of adsorption elements. Accordingly, the zeolite produced in the present invention is an aluminophosphate (AlPO) zeolite comprising at least aluminum atoms and phosphorus atoms in the framework structure, or a $5 \leq SiO_2/Al_2O_3 \leq 2000$ (molar ratio) aluminosilicate zeolite comprising at least aluminum atoms and silicon atoms in the framework structure. Preferably, the framework density of the "zeolite" ranges from $12.01/1,000$ Å$^3$ to $17.51/1,000$ Å$^3$. The zeolite structure of the "zeolite" is preferably AFI or CHA as established by the IZA (International Zeolite Association).

In regard of the AlPO zeolite, the aluminum atoms and phosphorus atoms that make up the framework structure may be substituted by other atoms such as transition metals. Among the foregoing, I) a Me-aluminophosphate, in which aluminum atoms are partly substituted by a hetero-atom (Me1: where Me1 denotes at least one element selected from among elements of group 2, group 7, group 8, group 11, group 12 and group 13 (excluding Al) belonging to period 3 or period 4 of the periodic table); II) a Me-aluminophosphate in which phosphorus atoms are substituted by a hetero-atom (Me2: where Me2 is an element of group 14, belonging to periods 3 through 5 of the periodic table); and III) a Me-aluminophosphate in which both aluminum atoms and phosphorus atoms are substituted by a hetero-atom (Me1 and Me2, respectively), are preferred from the viewpoint of adsorption characteristics.

The hetero-atom Me in the "zeolite" of the present invention may include one type alone, or two or more types. Preferred instances of Me (Me1, Me2) are elements belonging to period 3 or 4 of the periodic table. In particular, Me1 is preferably in a divalent state and the ionic radius ranges from 0.3 nm to 8 nm; more preferably Me1 is divalent, and the ionic radius thereof in a tetracoordinated state ranges from 0.4 nm to 7 nm. Among the foregoing, preferably at least one element selected from among copper, iron, cobalt, magnesium, zinc and tin, more preferably one or two or more types selected from among copper, iron and tin, and particularly preferably iron, is used as the hetero-atom Me1, in terms of ease of synthesis and adsorption characteristics in a case where the zeolite is used as an adsorption element. Further, Me2 is an element of group 14, belonging to period 3 or 4 of the periodic table, preferably silicon atoms.

The composition ratios (molar ratios) of Me, Al and P that make up the framework structure of the "zeolite" are ordinarily the molar ratios given in Formulas 1-1 to 3-1 below, preferably the molar ratios given in Formulas 1-2 to 3-2 below.

$$0 \leq x \leq 0.3 \qquad 1\text{-}1$$

(x represents the molar ratio of Me with respect to the total of Me, Al and P)

$$0.2 \leq y \leq 0.6 \qquad 2\text{-}1$$

(y represents the molar ratio of Al with respect to the total of Me, Al and P)

$$0.3 \leq z \leq 0.6 \qquad 3\text{-}1$$

(z represents the molar ratio of P with respect to the total of Me, Al and P)

$$0.01 \leq x \leq 0.3 \qquad 1\text{-}2$$

(x represents the molar ratio of Me with respect to the total of Me, Al and P)

$$0.3 \leq y \leq 0.5 \qquad 2\text{-}2$$

(y represents the molar ratio of Al with respect to the total of Me, Al and P)

$$0.4 \leq z \leq 0.5 \qquad 3\text{-}2$$

(z represents the molar ratio of P with respect to the total of Me, Al and P)

When x is smaller than the above ranges, there decreases the adsorption amount at regions of low adsorbate pressure, and synthesis tends to be difficult, in a case where the zeolite is used as an adsorption element. When x is larger than the above ranges, impurities tend to be readily mixed in during the synthesis. Synthesis is likewise difficult when y and z lie outside the above ranges.

In a case where the "zeolite" of the present invention is an aluminosilicate zeolite, some of the silicon atoms and the aluminum atoms in the framework structure (this may apply to all atoms, in the case of aluminum atoms) may be substituted by other atoms, for instance atoms of magnesium, titanium, zirconium, vanadium, chromium, manganese, iron, cobalt, zinc, gallium, tin, boron or the like. When the molar ratio of silicon atoms to aluminum atoms (aluminum atoms+hetero-atoms) in the case of an aluminosilicate zeolite is excessively low, for instance an A-zeolite or Y-zeolite is generated preferentially, and the desired "zeolite" fails to be obtained. Crystallization of the "zeolite" slows down when the above molar ratio is excessively high. Accordingly, the molar ratio of $SiO_2/Al_2O_3$ in the zeolite used in the present invention is ordinarily 5 or higher, preferably 10 or higher, and more preferably 15 or higher. The upper limit is 2000 or lower, preferably 1000 or lower, and yet more preferably 500 or lower. According to the conventions in the zeolite industry, the ratio of the numbers of silicon atoms to aluminum atoms in $SiO_2/Al_2O_3$ is expressed as a ratio of oxides in measurement results obtained through composition analysis, for instance, ICP emission spectrometry, X-ray fluorescence analysis or the like.

These "zeolites" include zeolites having exchangeable cationic species. Examples of the cationic species in such a case include, for instance, protons, alkali elements such as Li and Na, alkaline earth elements such as Mg and Ca, rare earth elements such as La and Ce, and transition metals such as Fe, Co and Ni. Preferred herein are protons, alkali elements, alkaline earth elements or rare earth elements. Yet more preferred are protons, Li, Na, K, Mg and Ca.

Preferably, the framework density (FD) of the "zeolite" of the present invention ranges from $12.01/1,000$ Å$^3$ to $17.51/1,000$ Å$^3$; in particular, the lower limit value of the framework density is $13.01/1,000$ Å$^3$ or higher, particularly preferably $14.01/1,000$ Å$^3$ or higher. The value of framework density is the value described in ATLAS OF ZEOLITE FRAMEWORK TYPES (Sixth Revised Edition, 2007, ELSEVIER) by Ch. Baerlocher et al., where T/1,000 Å$^3$ is a unit representing framework density and that denotes T atoms present in a unit volume of 1,000 Å$^3$ (number of atoms, other than oxygen atoms, that make up the framework per 1,000 Å$^3$ of zeolite). The structure becomes stable and durability higher when the framework density of the "zeolite" is equal to or higher than the above lower limit value. Adsorption capacity is large and the zeolite is suitable as an adsorbent or the like when the framework density is not higher than the above upper limit values.

Examples of the structure of the "zeolite", according to codes established by the IZA (International Zeolite Association) include, for instance, LTA, FER, MFI, FAU, DDR, NSI, ACO, AEI, AEL, AET, AFG, AFI, AFN, AFR, AFS, AFT, AFX, AFY, AST, ATN, ATO, ATS, ATT, AWW, *BEA, BEC, BOG, BPH, BRE, CAN, CGF, CGS, CHA, CON, CZP, DFO, DFT, DON, EAB, EDI, EMT, EON, ERI, ESV, ETR, EZT, FAR, FRA, GIS, GIU, GME, HEU, IFR, ISV, ITE, IWR, IWV, IWW, KFI, LEV, LIO, LOS, MAR, MAZ, MEI, MER, MOR, MOZ, MSE, MWW, NAB, OBW, OFF, OSO, OWE, PAU, PHI, RHO, RSN, RTE, RTH, SAO, SAS, SAT, SAV, SBE, SBS, SBT, SFF, SFO, SIV, SOD, SOS, STF, STI, STT, TER, TOL, TSC, UFI, UOZ, USI, UTL, VFI, VNI, VSV, -WEN, ZON and the like. Among the foregoing, the zeolite of the present invention is preferably any one selected from among AEI, AEL, AFI, CHA and LEV, particularly preferably AFI or CHA, and especially AFI.

The average particle size of the "zeolite" of the present invention is preferably 0.1 μm or greater, more preferably 1 μm or greater and yet more preferably 2 μm or greater. The upper limit is preferably 100 μm or smaller, particularly preferably 50 μm or smaller. As described above, the method for producing the "zeolite" of the present invention allows producing a "zeolite" of comparatively large particle size, namely having an average particle size ranging from 2 to 50 μm, as the "zeolite" before template removal. Accordingly, the produced "zeolite" can be used pulverized and be used as a granulate, as needed.

Aqueous Gel

An aqueous gel having the starting material that is used to produce the "zeolite" of the present invention will be explained next.

Starting Materials

The aqueous gel (starting material mixture) that constitutes the starting material in a case where the aluminophosphate zeolite of the present invention is produced by hydrothermal synthesis is prepared ordinarily through mixing of an aluminum source and a phosphorus source, and, as needed, a Me source such as Fe, and a template. Needless to say, the aqueous gel may comprise other components, so long as the effect of the present invention is not impaired thereby. For instance, the aqueous gel may comprise seed crystals in a case where an unreacted material is refluxed, as described above in the explanation of the apparatus that can be used in the present invention. The same applies to the starting material of the aluminosilicate zeolite described below.

Examples of the aluminum source (starting material compound for supplying aluminum) are not particularly limited, and ordinarily examples thereof include, for instance, one or two or more from among pseudoboehmite, aluminum alkoxides such as aluminum isopropoxide or aluminum triethoxide, aluminum hydroxide, alumina sol, sodium aluminate and the like, preferably pseudoboehmite which is easy to handle and is highly reactive.

Ordinarily, phosphoric acid is used as the phosphorus source (starting material compound for supplying phosphorus), but aluminum phosphate may be used instead.

Herein, Me denotes the hetero-atom in the explanation of the "zeolite" of the present invention above, and is preferably, for instance, Si, Fe, Co, Mg or Zn. As the Me source (starting material compound for supplying Me) there are ordinarily used inorganic acid salts of the foregoing, for instance sulfates, nitrates or phosphates, or organic acid salts such as an acetates and oxalates, or organometallic compounds. In some cases a colloidal hydroxide or the like may also be used.

Among the foregoing, fumed silica, silica sol, colloidal silica, waterglass, ethyl silicate, methyl silicate or the like is used as a Si source (starting material compound for supplying Si). These Me sources may be used singly or in mixtures of two or more types.

Examples of the template that is used as a starting material (starting material compound) of the aluminophosphate zeolite include, for instance, tetraalkylammonium such as tetramethylammonium, tetraethylammonium, tetrapropylammonium and tetrabutylammonium, as well as primary amines, secondary amines, tertiary amines and polyamines such as morpholine, di-n-propylamine, tri-n-propylamine, tri-isopropylamine, triethylamine, triethanolamine, piperidine, piperazine, cyclohexylamine, 2-methylpyridine, N,N-dimethylbenzylamine, N,N-diethylethanolamine, dicyclohexylamine, N,N-dimethylethanolamine, choline, N,N'-dimethylpiperazine, 1,4-diazabicyclo (2,2,2)octane, N-methyldiethanolamine, N-methylethanolamine, N-methylpiperidine, 3-methylpiperidine, N-methyl-cyclohexylamine, 3-methylpyridine, 4-methylpyridine, quinuclidine, N,N'-dimethyl-1,4-diazabicyclo-(2,2,2)octane ions, di-n-butylamine, neopentylamine, di-n-pentylamine, isopropylamine, t-butylamine, ethylenediamine, pyrrolidine, 2-imidazolidone, di-isopropyl-ethylamine, dimethylcyclohexylamine, cyclopentylamine, N-methyl-n-butylamine, hexamethyleneimine and the like.

Preferred among the foregoing are morpholine, triethylamine, cyclohexylamine, isopropylamine, di-isopropyl-ethylamine, n-methyl-n-butylamine, and tetraethylammoniumhydroxide, in terms of reactivity, and more preferably morpholine, triethylamine and cyclohexylamine, which are industrially cheaper. The foregoing may be used singly or in mixtures of two or more types.

The aqueous gel (starting material mixture) that constitutes the starting material in a case where the aluminosilicate zeolite of the present invention is produced by hydrothermal synthesis is prepared ordinarily through mixing of an aluminum source and a silicon source, and, as needed, a Me source such as Fe, an alkali metal or alkaline-earth metal, and a template.

The same starting materials (starting material compounds) as those in the case of the synthesis of above aluminophosphate can be used herein as the aluminum source, the silicon source and the Me source. In the synthesis of the aluminosilicate zeolite, however, an aluminum source (referred to hereafter as "crystalline aluminum source") that comprises crystalline aluminum hydroxide, crystalline aluminum oxyhydroxide or crystalline aluminum oxide is preferably used as the aluminum source. Examples of crystalline aluminum hydroxides include, for instance, gibbsite, bayerite, nordstrandite, doyleite and the like. Examples of crystalline aluminum oxyhydroxides include, for instance, boehmite (γ-AlOOH), diaspore (α-AlOOH) and the like. Examples of crystalline aluminum oxides include, for instance, α-Al$_2$O$_3$ (Co-random), χ-Al$_2$O$_3$, δ-Al$_2$O$_3$, γ-Al$_2$O$_3$, η-Al$_2$O$_3$, κ-Al$_2$O$_3$, θ-Al$_2$O$_3$ and the like. Preferred among the foregoing is a crystalline aluminum source that comprises crystalline aluminum hydroxide or a crystalline aluminum oxyhydroxide, yet more preferably a crystalline aluminum source that comprises gibbsite, bayerite or boehmite, and particularly preferably a crystalline aluminum source that comprises gibbsite or bayerite.

Crystallization of the zeolite can be speeded up by using a crystalline aluminum source as a starting material compound. The reasons for this are unclear, but are presumed to involve the following. Non-crystalline aluminum sources, in other words amorphous aluminum sources, are highly reactive, and, accordingly, an aqueous gel, in particular a zeolite precursor gel in which seed crystals have been added to the aqueous gel, reacts with the silicon source before the zeolite precursor gel reaches the zeolite crystallization temperature, and a silica-alumina compound of poor reactivity is generated. Crystalline aluminum sources, on the other hand, exhibit low reactivity, and hence the zeolite precursor gel reacts with the silicon source only after having reached the zeolite crystallization temperature, whereupon a zeolite is generated promptly.

Ordinarily, an amine or quaternary ammonium salt is used as the template that is utilized as a starting material (starting material compound) of the aluminosilicate zeolite. Preferred organic templates for the synthesis of CHA-type aluminosilicates are disclosed in, for instance, the specifications of U.S. Pat. No. 4,544,538 and US Patent Application Publication No. 2008/0075656. Specific examples include, for instance, cations derived from alicyclic amines, such as cations derived from 1-adamantaneamine, cations derived from 3-quinuclidinol and cations derived from 3-exo-aminonorbornene. Among the foregoing, Cations derived from 1-adamantaneamine are more preferable. Yet more preferred are N,N,N-trialkyl-1-adamantaneammonium cations, from among cations derived from 1-adamantaneamine. The three alkyl groups in N,N,N-trialkyl-1-adamantaneammonium cations are ordinarily independent alkyl groups, preferably lower alkyl groups, and more preferably methyl groups. The most preferred cations among the foregoing are N,N,N-trimethyl-1-adamantaneammonium cations.

Hydroxide ions of the counter anions of the organic template, alkali metal hydroxides such as NaOH, KOH or the like, as well as alkaline-earth metal hydroxides such as $Ca(OH)_2$, can be used herein as the alkali metal or alkaline-earth metal that are used as starting material compounds. The alkali metal and the alkaline-earth metal are not particularly limited, and are ordinarily, Na, K, Li, Rb, Cs, Ca, Mg, Sr or Ba, preferably Na or K. Two or more types of alkali metal and the alkaline-earth metal may be used concomitantly.

Seed Crystals

In the present invention seed crystals are used as one component of the starting material (starting material compound) for producing the "zeolite".

Preferably, the seed crystals used in the present invention have for instance a composition and zeolite structure similar to those of the "zeolite" that is to be produced. The crystallinity of the seed crystals is not particularly limited, and the seed crystals may comprise an amorphous component. The "zeolite" before removal or after removal of the template can be used as the seed crystals.

Preferably, therefore, the seed crystals are produced out of a zeolite precursor gel having the same formulation as that of the zeolite precursor gel that is used to produce the "zeolite", or out of an aqueous gel which, except for not comprising seed crystals, has the same formulation as that of the zeolite precursor gel that is used to produce the "zeolite". The seed crystals dissolve partially during hydrothermal synthesis, and may become no longer visible; the seed crystals, however, are not completely dispersed at the atomic level, but present in the form of microscopic lumps that constitute, for instance, the start point during growth of the zeolite crystal. The effect elicited thereby is not only a conventionally known effect, such as an effect of improving the growth and the particle size distribution of the "zeolite", but also an effect for instance of making it possible to curtail fluctuation of the aqueous gel pressure caused by rapid crystal growth during production over a short time, as in the present invention, as well as an effect of enhancing stability in the supply of the aqueous gel and improving thermal efficiency through a reduction of the wall thickness of the tubular reactor.

The method for producing the zeolite that constitutes the seed crystals is not particularly limited, and the zeolite may be produced in accordance with the method for producing the "zeolite" of the present invention, or may be produced in accordance with some other method, for instance, a typical batch method using an autoclave or the like.

When the particle size of the seed crystals is excessively large, the circulation of the zeolite precursor gel may become hampered in the above-described tubular reactor that is used in the present invention, whereas when the particle size of the seed crystals is excessively small, the effect of the seed crystals may fail to be sufficiently brought out. Therefore, the particle size of the seed crystals, in terms of average particle size, is 0.01 µm or greater, more preferably 0.1 µm or greater, with an upper limit of 100 µm or smaller, particularly preferably 50 µm or smaller. Therefore, it is preferable to adjust the particle size as appropriate, through pulverizing or the like, in a case where the particle size of the produced seed crystals is excessively large. Examples of the pulverizing method involve using for instance a ball mill, a bead mill, a planetary ball mill, a jet mill or the like. Preferred among the foregoing is a bead mill, since such a mill allows keeping amorphization of the zeolite to a minimum while pulverizing the zeolite efficiently. The bead mill is an apparatus for crushing and pulverizing using ceramic beads having ordinarily a particle size ranging from 50 to 500 µm.

To determine the average particle size of the seed crystals, several tens of particles are selected randomly from a scanning electron micrograph, the cross-sectional area of the particles is worked out by image analysis software, the particle size of each particle is calculated on the basis of the expression below, and the arithmetic average of the obtained particle size values is taken as the average particle size.

$$\text{(Particle size)} = 2 \times \sqrt{(\text{cross-sectional area})/\pi} \qquad \text{[Math. 1]}$$

When the addition amount of seed crystals is excessively small, the effect of adding the seed crystals cannot be sufficiently brought out, whereas when the addition amount is excessively large, the proportion of seed crystals with respect to the "zeolite" to be produced increases, which is undesirable from the viewpoint of production efficiency. Therefore, the seed crystals are preferably 0.1 wt % or more, particularly preferably 1 wt % or more with respect to the aluminum source, in terms of $Al_2O_3$, in the aqueous gel used to produce the aluminophosphate zeolite. Preferably, the seed crystals are added in an amount the upper limit whereof is 20 wt %, particularly preferably 15 wt % or less. The seed crystals are preferably 0.1 wt % or more, particularly preferably 1 wt % or more, with respect to the silicon source, in terms of $SiO_2$, of the silicon source in the aqueous gel used to produce the aluminosilicate zeolite. The seed crystals are added in an amount the upper limit whereof is preferably 20 wt %, particularly preferably 15 wt % or less.

Preparation of an Aqueous Gel (Mixing of Starting Material Compounds)

The order in which the above-described aluminum source, phosphorus source, seed crystals and, as needed, a Me source, a template and water are mixed when preparing the aqueous gel (starting material mixture) for aluminophosphate synthesis varies depending on the conditions, but ordinarily, the phosphorus source, the aluminum source and water are mixed first, and the resulting mixture has then the Me source and the template mixed thereinto, followed as needed by aging, as described below. The seed crystals are added last to this aqueous gel (starting material mixture), to yield a zeolite precursor gel. (A mixture of two or more starting material compounds is referred to herein as "starting material mixture". In the present description, the mixture resulting from mixing, in the necessary amounts, all the starting material compounds necessary for producing the "zeolite" is referred to as "zeolite precursor gel".)

The composition of the aqueous gel (starting material mixture), expressed as a molar ratio of oxides $P_2O_5/Al_2O_3$, is ordinarily 0.6 or higher, and from the viewpoint of ease of synthesis, preferably 0.7 or higher, and more preferably 0.8 or higher. The composition expressed as the molar ratio of oxides, $P_2O_5/Al_2O_3$, is ordinarily 1.7 or lower, preferably 1.6 or lower, and more preferably 1.5 or lower. In a case where a Me source is used, ordinarily the ratio $MeO_x$ (x is 1 when Me is divalent, and 1.5 when Me is trivalent)/$P_2O_5$ is 0.01 or higher, and is 1.5 or lower. Preferably, the ratio is 0.02 or higher, more preferably 0.05 or higher. The ratio $MeO_x/P_2O_5$ is ordinarily 1.5 or lower, and from the viewpoint of ease of synthesis, preferably 1.0 or lower, and more preferably 0.8 or lower. In a case where a template is used, the template is preferably mixed at a molar ratio of 0.2 or higher, particularly preferably 0.5 or higher, and 4 or lower, particularly preferably 3 or lower, with respect to $Al_2O_3$. When the use amount of the template is excessively small, crystallization does not occur readily, and hydrothermal durability is insufficient, whereas when the use amount of the template is excessively large, the yield of the "zeolite" drops. The lower limit of the proportion of water, as a molar ratio with respect to $Al_2O_3$, is 3 or higher, and from the viewpoint of ease of synthesis, preferably 5 or higher, more preferably 10 or higher. The upper limit of the proportion of water is 200 or lower, and from the viewpoint of ease of synthesis and achieving high productivity, preferably 150 or lower and more preferably 120 or lower.

Components other than those above may be present concurrently, as desired, in the aqueous gel (starting material mixture). Examples of such components include, for instance, hydroxides or salts of alkali metals and alkaline-earth metals, and hydrophilic organic solvents such as alcohols. The above considerations apply also to the "zeolite precursor gel".

The order in which the above-described aluminum source, silicon source, seed crystals and, as needed, a Me source such as Fe, an alkali metal or alkaline-earth metal, a template and water are mixed when preparing the aqueous gel for aluminosilicate varies depending on the conditions, but ordinarily, the Me source, the aluminum source, an alkali metal or alkaline-earth metal and water are mixed first, and the resulting mixture has then mixed the silicon source and the template mixed thereinto, followed as needed by aging, as described below. The seed crystals are added lastly to this aqueous gel (starting material mixture), to yield a final starting material mixture (zeolite precursor gel).

The composition of the aqueous gel, expressed as the molar ratio of oxides $SiO_2/Al_2O_3$, is ordinarily 4 or higher, and from the viewpoint of ease of synthesis, preferably 5 or higher, more preferably 10 or higher, and particularly preferably 15 or higher. The upper limit of the composition of the aqueous gel expressed as the molar ratio of oxides, $SiO_2/Al_2O_3$, is not particularly limited, since the entire composition may be Si, but is preferably 2000 or lower, more preferably 1000 or lower, and particularly preferably 500 or lower. In a case where a Me source is used, ordinarily the ratio $MeO_x$ (x is 1 when Me is divalent, and 1.5 when Me is trivalent)/$SiO_2$ is 0.0001 or higher. Preferably, the ratio is 0.0002 or higher, more preferably 0.0005 or higher, from the viewpoint of ease of synthesis. The ratio $MeO_x/SiO_2$ is ordinarily 0.1 or lower, and from the viewpoint of ease of synthesis, preferably 0.05 or lower, more preferably 0.02 or lower. In a case where a template is used, the template is preferably mixed at a molar ratio of 0.02 or higher, particularly preferably 0.1 or higher, and 1 or lower, particularly preferably 0.5 or lower, with respect to $SiO_2$. When the use amount of the template is excessively small, crystallization does not occur readily, and hydrothermal durability is insufficient, whereas when the use amount of the template is excessively large, the yield of the "zeolite" drops. The lower limit of the proportion of water, as a molar ratio with respect to $SiO_2$, is 3 or higher, and from the viewpoint of ease of synthesis, preferably 5 or higher, more preferably 10 or higher. The upper limit of the proportion of water with respect to $SiO_2$ is 200 or lower, and from the viewpoint of ease of synthesis and achieving high productivity, preferably 150 or lower and more preferably 120 or lower.

Aging

The term "aging" denotes herein the feature of keeping the starting material mixture at a temperature at which no crystals are newly generated, for a predetermined period of time. Aging allows promoting for instance dissolution of the starting material compounds and generation of crystal nuclei during hydrothermal synthesis, and allows further shortening the time of hydrothermal synthesis.

The aging temperature is not particularly limited, so long as it lies within a temperature range at which no zeolite, phosphate, aluminum compound, silicon compound and so forth crystallizes anew. Ordinarily, the aging temperature is room temperature or higher, preferably 50° C. or higher, more preferably 70° C. or higher, and ordinarily 150° C. or lower, preferably 120° C. or lower and more preferably 100° C. or lower. When the temperature is excessively low, the effect of aging is not manifested, whereas when the temperature is excessively high, the zeolite and so forth starts crystallizing. As used herein, the term room temperature denotes ordinarily a range from 10 to 40° C.

The aging time is at least 2 hours or longer, ordinarily 6 hours or longer, preferably 12 hours or longer and more preferably 24 hours or longer. The aging time is counted commencing at the point in time at which the composition of the starting material mixture that is to be aged is obtained through mixing of the starting material compounds and the starting material mixture. Aging is terminated at the point in time at which other starting material compounds or the starting material mixture is added to the starting material mixture to be aged, or the point in time at which the starting material mixture that is to be aged is subjected to hydrothermal synthesis. The aging effect is not manifested when the aging time is excessively short. The upper limit of the aging time is not particularly limited, but is ordinarily of 120 hours or less, preferably 96 hours or less.

Use of the "Zeolite" as a Catalyst

The "zeolite" obtained in accordance with the production method of the present invention can be used as a catalyst that allows producing propylene by being brought into contact with ethylene and/or ethanol.

Silylation of the "Zeolite"

The outer surface of the "zeolite" may be silylated in a case where the "zeolite" obtained in the present invention is used as a catalyst for producing propylene. The silylation method is not particularly limited, and for instance the method described in WO 2010/128644 can be resorted to.

The outer surface acid content of the "zeolite" obtained by silylation is not particularly limited, but ordinarily a preferred "zeolite" has a total acid content comprised in the crystal of 5% or lower.

The outer surface acid content denotes herein the quantity of acid sites present on the outer surface of the "zeolite". The total acid content comprised in the crystal is the total sum of quantity of acid sites present within crystal pores and quantity of outer surface acid sites. These values can be measured in the present invention in accordance with the methods described in WO 2010/128644.

When the outer surface acid site are too numerous, reactions that are not shape-selective tend to occur on the outer surface of the catalyst, and by-products tend to increase, in a case where the "zeolite" is used as a catalyst for production propylene. Accordingly, the smaller the outer surface acid content, the better it is.

Molding Process

In a case where the "zeolite" obtained in the present invention is used as a catalyst in reactions, the "zeolite" may be used as-is, or may be pelletized and molded in accordance with known methods using known substances and binders that are inert towards reactions, or may be mixed with foregoing to be used in reactions. Propylene selectivity can be increased by reducing, through molding, the outer surface acid content of the "zeolite" to a preferred ratio with respect to the total acid content.

Examples of substances and binders that are inert towards reactions include, for instance, alumina or alumina sol, silica, silica sol, quartz and mixtures of the foregoing. The method for reducing the outer surface acid content through molding may be, for instance, a method that involves bonding the binder to the acid sites on the outer surface of the "zeolite".

Method for Producing Propylene

Production of propylene by using the "zeolite" obtained in accordance with the production method of the present invention as a catalyst can be accomplished by resorting to a known method. Specifically, the method described in Japanese Patent Application Publication No. 2007-291076 and the method described in WO 2010/128644 can be resorted to herein.

Use of a Transition Metal-Containing Zeolite as a Catalyst for Nitrogen Oxide Purification The "zeolite" obtained in accordance with the production method of the present invention can be used as a catalyst for nitrogen oxide purification, through incorporation of a transition metal into the "zeolite".

A catalyst that comprises the transition metal-containing zeolite resulting from incorporating a transition metal into the "zeolite" obtained in the present invention is effective as a catalyst for purifying nitrogen oxides, by coming into contact with exhaust gas that comprises nitrogen oxides. The exhaust gas may comprise components other than nitrogen oxides, for instance hydrocarbons, carbon monoxide, carbon dioxide, hydrogen, nitrogen, oxygen, sulfur oxides and water. Known reducing agents such as hydrocarbons and nitrogen-comprising compounds such as ammonia, urea or the like may be used concomitantly. Specifically, the catalyst for nitrogen oxide purification of the present invention allows purifying nitrogen oxides comprised in a wide variety of exhaust gas types, emitted for instance from various kinds of diesel engines, boilers and gas turbines in diesel automobiles, gasoline automobiles, stationary power generators, ships, agricultural machinery, construction machinery, motorcycles and aircraft.

Transition Metal

The transition metal used in the present invention is not particularly limited, so long as it exhibits catalytic activity supported on a zeolite, but is preferably selected from among iron, cobalt, palladium, iridium, platinum, copper, silver, gold, cerium, lanthanum, praseodymium, titanium, zirconium and the like. The transition metal is more preferably iron or copper. The transition metal supported on the zeolite may be a combination of two or more transition metals.

Transition Metal-Containing Zeolite

In one method, a transition metal-containing zeolite is obtained through synthesis from a gel that comprises the transition metal at the time of hydrothermal synthesis. In another method, the transition metal is caused to be supported on a fired zeolite. The method for causing the transition metal to be supported on a fired zeolite may be a method ordinarily resorted to, for instance ion exchange, impregnation support, precipitation support, solid-phase ion exchange or CVD. An ion exchange method or an impregnation support method are preferred herein. A thermal treatment is optionally performed, at a temperature ranging from 400° C. to 900° C., after drying. Preferably, the thermal treatment is performed at 700° C. or above, in order to increase metal dispersion and to enhance interactions with the zeolite surface. The atmosphere of the thermal treatment is not particularly limited, and the thermal treatment may be performed in an air atmosphere, or in an inert atmosphere of nitrogen, argon or the like. The atmosphere may comprise water vapor.

EXAMPLES

The present invention will be explained next in specific terms by way of examples, but the present invention is not limited to the examples below if it does not go beyond the gist thereof.

Synthesis Example 1

Synthesis of Seed Crystals

Herein, 85 wt % of phosphoric acid, pure water and pseudoboehmite (Catapal C, by Sasol) were stirred and mixed for 24 hours. Then, a 40 wt % aqueous solution of tetrapropylammonium hydroxide (by Sachem, hereafter referred to as "TPAOH" for short) was added to the obtained starting material mixture, with further stirring for 24 hours, to prepare an aqueous gel having the composition (molar ratio) below.

$$Al_2O_3:P_2O_5:TPAOH:H_2O=1:1:1:50$$

The aqueous gel was subjected to hydrothermal synthesis under autogenous pressure, at 180° C. for 24 hours, in Teflon-lined autoclave. The obtained product slurry was filtered, washed with water, and dried, to yield an AFI-type AlPO zeolite for seed crystals.

Example 1

An aqueous gel was prepared in accordance with the same method as in Synthesis example 1. To this aqueous gel there were added the seed crystals synthesized in Synthesis example 1, to a proportion of 0.1 parts by weight with respect to 1 part by weight of the $Al_2O_3$ in the aqueous gel, to prepare a seed crystal-containing aqueous gel (zeolite precursor gel) of Example 1.

The seed crystal-containing aqueous gel (zeolite precursor gel) of Example 1 was subjected to hydrothermal synthesis through heating, in an oil bath, of a tubular reactor resulting from winding, in the form of a coil, a stainless steel tube (wall thickness 0.5 mm) having a an outer diameter of 3.15 mm, an inner diameter of 2.15 mm ((volume)/(lateral surface area)=0.037 cm) and a length of 3 m. The amount of oil in the oil bath is about 1000 times the effective volume of the tubular reactor (volume of the interior of the reactor). The reactor was heated in the oil bath at 190° C., and the seed crystal-containing aqueous gel (zeolite precursor gel) of Example 1 was caused to circulate from the reactor inlet at a flow rate of 3.4 ml/min, using a syringe pump; a product slurry was recovered from the reactor outlet. The retention time of the AlPO precursor in the reactor was 3.2 minutes. The obtained product slurry was filtered, washed with water, and dried, to yield an AlPO zeolite.

Figure 4:
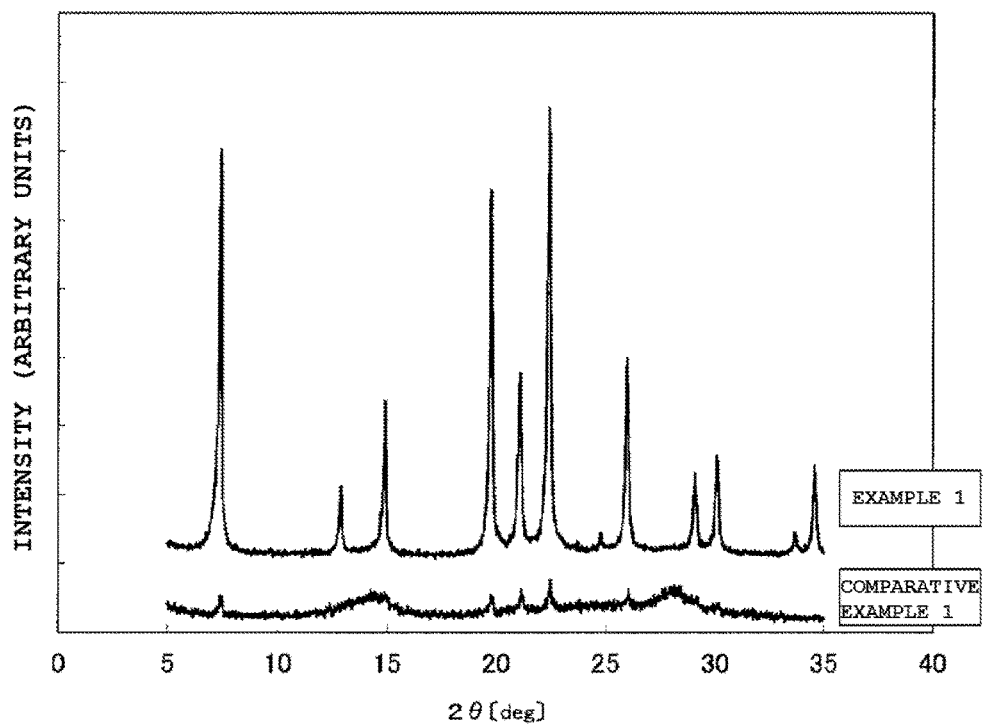
FIG. 4 is a set of XRD charts of an AlPO zeolite obtained in Example 1 and an AlPO zeolite obtained in Comparative example 1.

The obtained AlPO zeolite was found, in XRD analysis, to have an AFI-type structure. FIG. 4 illustrates an XRD chart of the obtained AlPO zeolite.

Figure 5:
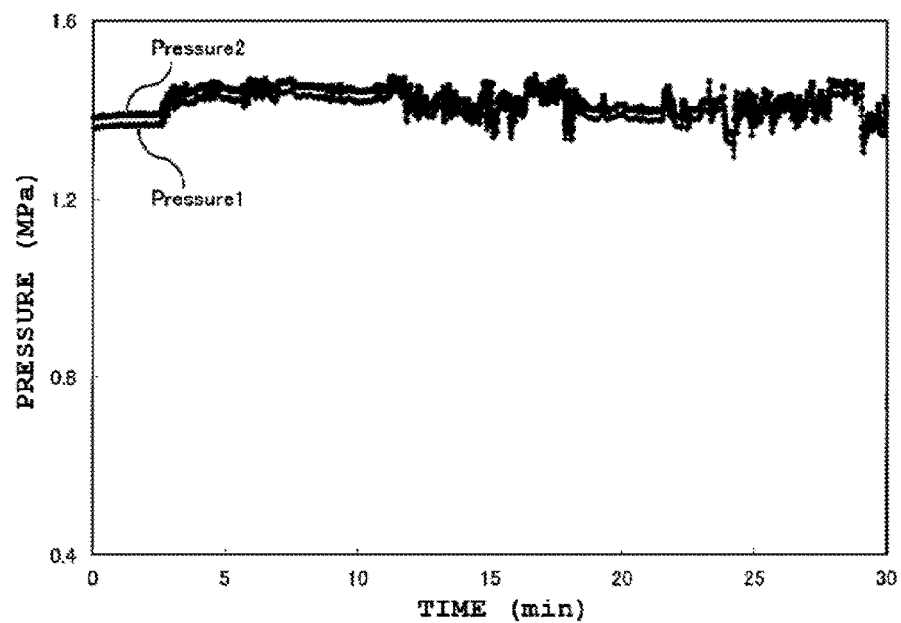
FIG. 5 is a graph illustrating the state of pressure fluctuation in a reactor in a case where seed crystals are added, in Example 1.

The pressure in the tubular reactor during the continuous reaction was measured by providing pressure sensors at the inlet and the outlet of the reactor. FIG. 5 illustrates the results of the change over time of the pressure. In FIG. 5, pressure 1 denotes the pressure on the inlet side of the reactor, and pressure 2 the pressure on the outlet side.

The degree of crystallinity and average particle size of the obtained AlPO zeolite were worked out in accordance with the below-described methods. The results are given in Table 1.

Degree of Crystallinity

The degree of crystallinity of the obtained AlPO zeolite was calculated on the basis of XRD analysis data. The degree of crystallinity (%) of the sample and of the seed crystals that were used was calculated in accordance with the expression below, by totaling the diffraction peak intensities of Miller indices (1 0 0), (1 1 0), (2 0 0), (2 1 0), (0 0 2), (2 1 1), (1 1 2), (2 2 0), (2 1 2), (4 0 0), (3 0 2) and (4 1 0).

Degree of crystallinity (%)=(total value of peak intensity of the sample)/(total value of peak intensity of the seed crystals)×100

A degree of crystallinity of 100% was assigned throughout in cases where the crystallinity of the product was high and the total value of peak intensity exceeded the total value of peak intensity of the seed crystals.

Average Particle Size

Figure 7:
FIG. 7 is a scanning electron micrograph of an AlPO zeolite obtained in Example 1.

The particle size of the obtained AlPO zeolite was calculated on the basis of scanning electron micrograph of the AlPO zeolite illustrated in FIG. 7. Herein, 20 particles were randomly selected in an electron micrograph at 3000 magnifications, the cross-sectional areas of the particles was worked out using image analysis software, the particle size of each particle was calculated on the basis of the expression below, and the arithmetic average of the obtained 20 particle size values was taken as the average particle size.

(Particle size)=2×√((cross-sectional area)/π)  [Math. 2]

Comparative Example 1

An AlPO zeolite was obtained in the same way as in Example 1, but herein seed crystals were not added to an aqueous gel that was prepared in the same way as in Synthesis example 1, and an air convection dryer heated to 190° C., instead of an oil bath, was used as the heat source of the reactor.

The obtained AlPO zeolite was found, in XRD analysis, to have an AFI-type structure. FIG. 4 illustrates an XRD chart of the obtained AlPO zeolite.

Figure 6:
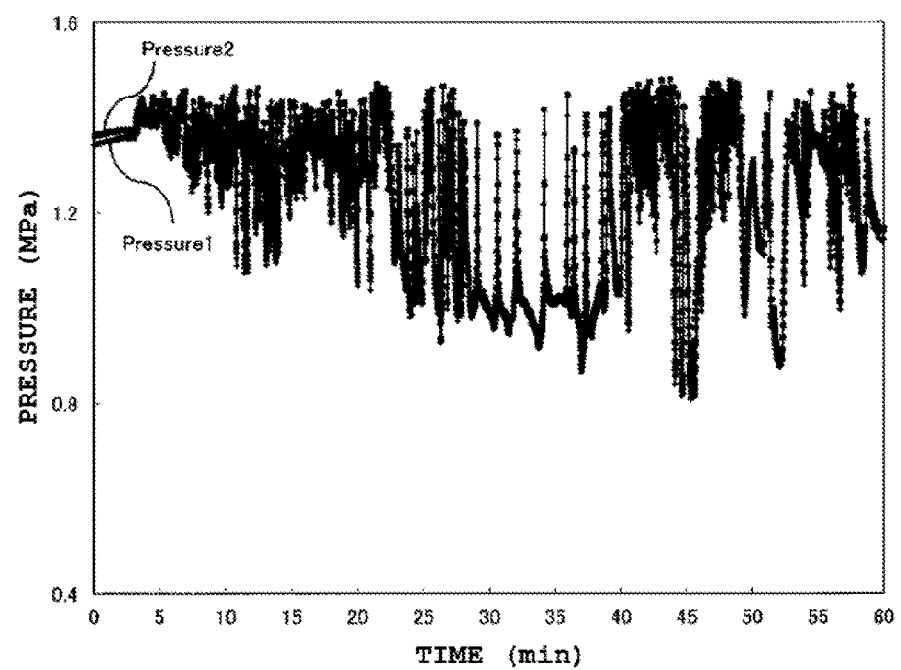
FIG. 6 is a graph illustrating the state of pressure fluctuation in a reactor when seed crystals are not added, in Comparative example 1.

The pressure in the tubular reactor during the continuous reaction was measured in the same way as in Example 1. FIG. 6 illustrates the results of the change over time of the pressure.

The degree of crystallinity of the obtained AlPO zeolite was worked out in the same way as in Example 1. The results are given in Table 1.

TABLE 1

| | Seed crystal | Heat source | Retention time (min) | Product | Degree of crystallinity (%) | Average particle size (μm) |
|---|---|---|---|---|---|---|
| Example 1 | Yes | Oil bath | 3.2 | AFI | 100 | 2.2 |
| Comparative example 1 | No | Air convection | 3.2 | AFI | 21 | — |

Table 1 reveals the following findings. The AlPO zeolite of Comparative example 1, where no seed crystals were added, exhibited a significant content of amorphous component in the crystals, and the degree of crystallinity was only 21%, i.e. quality was low.

In Example 1, where seed crystals were added, an AlPO zeolite could be obtained that had a degree of crystallinity of 100%. The average particle size of the zeolite obtained in Example 1 was 2.2 μm, and recovery by filtration was easy.

FIG. 5 and FIG. 6 reveal the following.

Pressure fluctuation in the reactor was small in Example 1, where seed crystals were added; by contrast, pressure fluctuation in the reactor was large in Comparative example 1, where no seed crystals were added.

Conceivable reasons for the large differences in pressure fluctuation derived from the presence or absence of seed crystals include the following.

When in accordance with the present invention the diameter of the tubular reactor is set to be small, equal to or smaller than 3 cm, the reaction occurs in a short time and the solid-liquid ratio in the reactor varies significantly; also, the reactor may become clogged temporarily, whereupon pressure fluctuation occurs. However, it is deemed that fluctuations in the solid/liquid ratio can be reduced and pressure fluctuation can be curtailed in a case where seed crystals are present in the starting material (aqueous gel), since solid seed crystals are originally present in the starting material (aqueous gel). In a case where the pressure fluctuation in the reactor is large, the wall thickness of the reactor needs to be large to a certain extent, so as to withstand these fluctuations. As a result, the heating efficiency of the reactor becomes poorer, and heating energy is lost in heating the reactor, not in the reaction. In the present invention, however, pressure fluctuations in the reactor are suppressed through the use of seed crystals, and hence the wall thickness of the reactor can be made smaller, which is advantageous in terms of thermal energy efficiency.

Comparative Example 2

In another embodiment of the present invention there was used a stainless-steel tubular reactor having an inner diameter of 4.4 mm, a wall thickness of 1 mm and a length of 13.5 cm, in order to simulate a method for producing a zeolite continuously through continuous introduction of a tubular reactor in a heating medium.

Into this tubular reactor there was charged a starting material (aqueous gel) identical to that of Example 1, except that herein no seed crystals were introduced, and hydrothermal synthesis was performed then by placing the tubular reactor in an air convection dryer at 190° C. for 10 minutes, 20 minutes, 30 minutes or 60 minutes, followed by filtration, water washing and drying as in Example 1, to yield a respective AlPO zeolite.

The XRD analysis of the obtained AlPO zeolites revealed that the peaks of the AlPO zeolite of a reaction time of 10 minutes were almost invisible. The peak intensities for the zeolites of 20 minutes and 30 minutes were low, and the degree of crystallinity thereof was insufficient. Distinct peaks were observed only in the zeolite of 60 minutes. An AlPO zeolite was thus found to have been obtained.

Comparative Example 3

Herein AlPO zeolites were obtained in the same way as in Comparative example 2, but now the heating medium was changed to oil, and the holding time was set to 3 minutes, 5 minutes, 10 minutes, 15 minutes or 20 minutes.

The XRD analysis of the obtained AlPO zeolites revealed that peaks of AlPO zeolite were almost invisible for the zeolite of reaction time of 3 minutes, and peak intensity was weak for the zeolites of reaction times of 5 minutes and 10 minutes. Distinct peaks were observed only in the zeolites of reaction times of 15 minutes and 20 minutes. Respective AlPO zeolites were thus found to have been obtained.

Example 2

Herein AlPO zeolites were obtained in the same way as in Comparative example 3, but now the holding time was set to 30 seconds, 1 minute, 2 minutes, 3 minutes or 5 minutes, using the same starting material as in Example 1 (comprising 10 wt % of seed crystals with respect to $Al_2O_3$: (zeolite precursor gel)). The (volume)/(lateral surface area) of the tubular reactor that was used was 0.076 cm.

The XRD analysis of the obtained AlPO zeolites revealed that peaks of AlPO zeolite were almost invisible for the zeolite of reaction time of 30 seconds, and peak intensity was weak for the zeolite of reaction time of 1 minute. Distinct peaks were observed only in the zeolites of reaction times of 2 minutes, 3 minutes and 5 minutes. Respective AlPO zeolites were thus found to have been obtained.

The degree of crystallinity of the foregoing AlPO zeolites was worked out in the same way as in Example 1. The results were 20% for the zeolite of 30 seconds, 50% for the zeolite of 1 minute, 90% for the zeolite of 2 minutes, and 100% for the zeolites of 3 minutes and 5 minutes.

Figure 8:
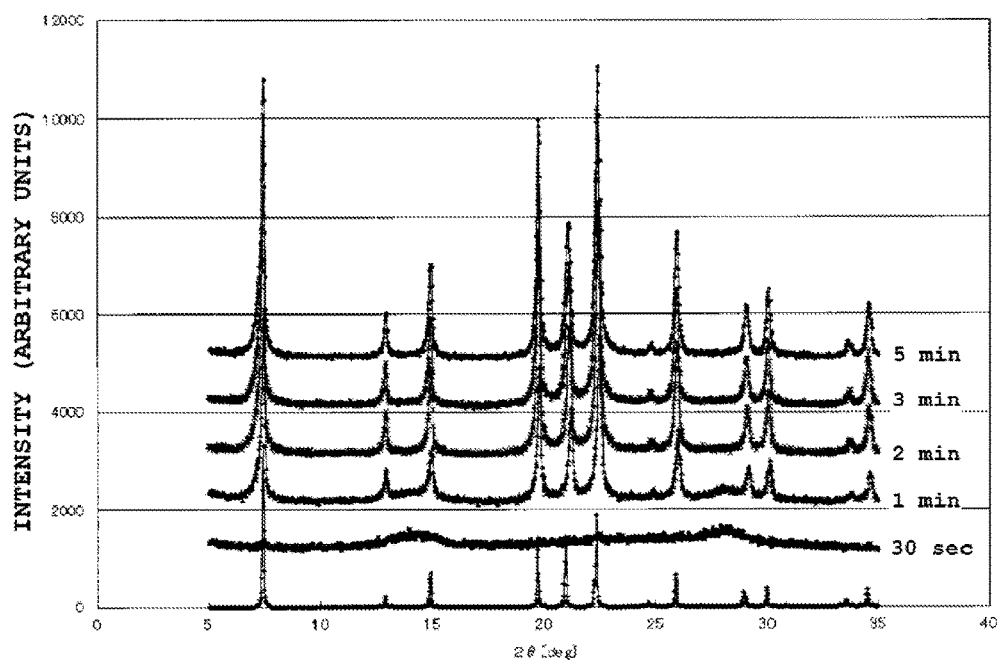
FIG. 8 is a set of XRD charts of AlPO zeolites obtained in Example 2.

FIG. 8 illustrates XRD charts of the obtained AlPO zeolites, along with a standard (XRD chart of a standard sample (seed crystals of Synthesis example 1)).

The framework density of the AlPO zeolites obtained in Examples 1 and 2 was 17.3 T/1000 Å$^3$.

Synthesis example 2: synthesis of seed crystals Herein, an aqueous solution of N,N,N-trimethyl-1-adamantammonium hydroxide (TMADAOH) (by Sachem Inc., containing 25 wt % of TMADAOH), pure water, sodium hydroxide, aluminum hydroxide (by Sigma-Aldrich Corporation, containing 53.5 wt % of $Al_2O_3$) and 30 wt % silica sol (Cataloid Si-30, by JGC C&C) were mixed and stirred for 2 hours. Thereafter, a CHA-type aluminosilicate zeolite ($SiO_2/Al_2O_3$=15) from which a template had been removed through firing was added as seed crystals to a proportion of 2 wt % with respect to the amount of $SiO_2$ in the starting material mixture. A final starting material mixture having the composition (molar ratio) below was thus prepared.

$Al_2O_3:SiO_2:NaOH:TMADAOH:H_2O=0.04:1:0.12:0.1:20$

The final starting material mixture was subjected to hydrothermal synthesis under autogenous pressure, at 160° C. for 24 hours, in an autoclave. The obtained product slurry was filtered, washed with water, and dried, to yield a CHA-type aluminosilicate zeolite ($SiO_2/Al_2O_3$=23.7) for seed crystals.

Example 3

Herein, an aqueous solution of N,N,N-trimethyl-1-adamantammonium hydroxide (TMADAOH) (by Sachem Inc. containing 25 wt % of TMADAOH), pure water, sodium hydroxide and aluminum hydroxide (by Wako Pure Chemical Industries, Ltd., containing 65.5 wt % of $Al_2O_3$)) were mixed and stirred for 1 hour. The aluminum hydroxide used in the present Example 3 comprises gibbsite. Further, 30 wt % silica sol (LUDOX LS colloidal silica) was added to the obtained starting material mixture, with further stirring for 1 hour. Thereafter, the CHA-type aluminosilicate zeolite ($SiO_2/Al_2O_3$=23.7) of Synthesis example 2 was added as seed crystals to a proportion of 10 wt % with respect to the amount of $SiO_2$ in the starting material mixture. A final starting material mixture having the composition (molar ratio) below was thus prepared.

$Al_2O_3:SiO_2:NaOH:TMADAOH:H_2O=0.04:1:0.12:0.1:20$

The final starting material mixture was aged for 4 days at room temperature, to yield a zeolite precursor gel. Thereafter, the zeolite precursor gel was sealed in the tubular reactor ((volume)/(lateral surface area)=0.11 cm) used in Comparative example 2, and the tubular reactor was heated for 60 minutes in an oil bath heated to 210° C. The obtained product slurry was filtered, washed with water, and dried, to yield an aluminosilicate zeolite.

Figure 9:
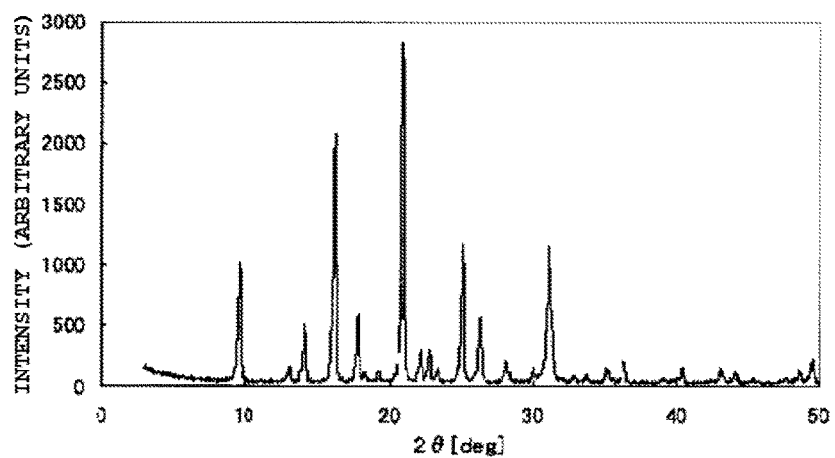
FIG. 9 is an XRD chart of an aluminosilicate zeolite obtained in Example 3.

The obtained aluminosilicate zeolite was found, in XRD analysis, to have a CHA-type structure. FIG. 9 illustrates an XRD chart of the obtained aluminosilicate zeolite.

Figure 10:
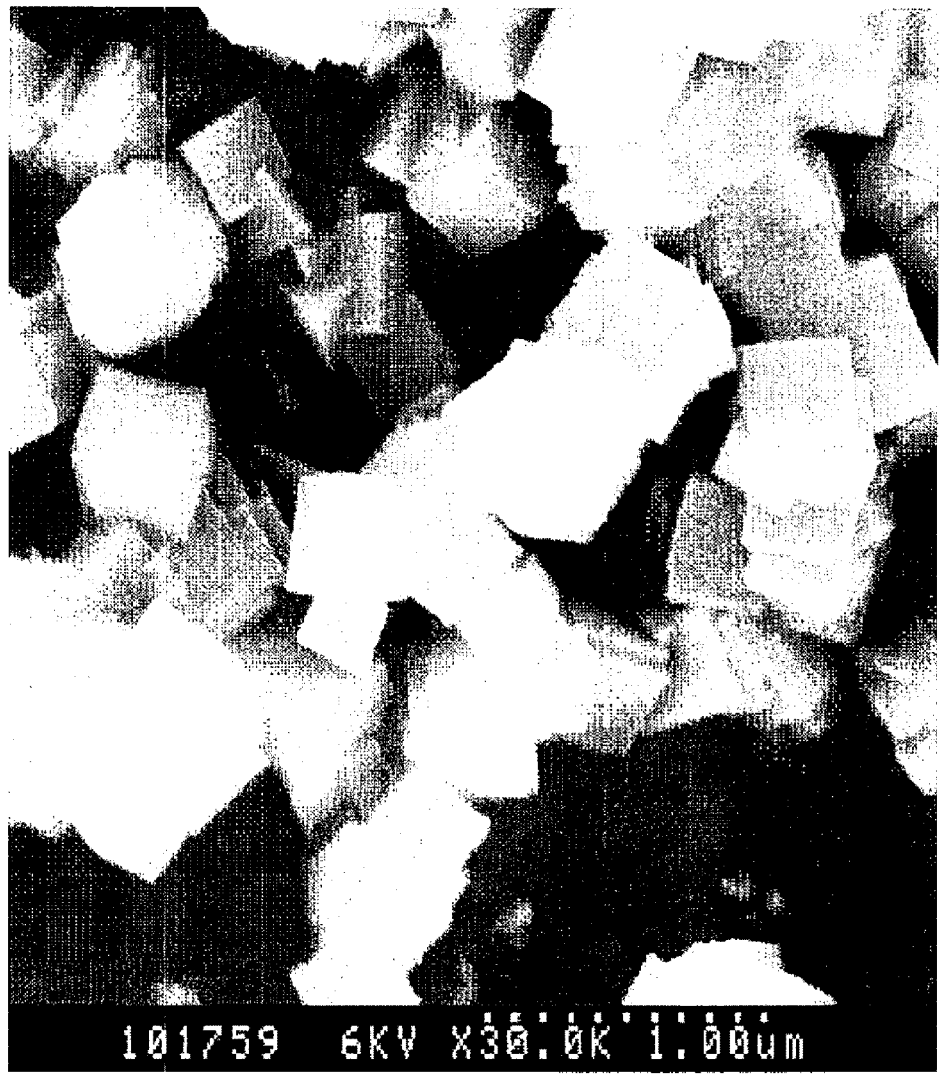
FIG. 10 is a scanning electron micrograph of the aluminosilicate zeolite obtained in Example 3.

The average particle size of the obtained aluminosilicate zeolite was worked out in accordance with the same method as in the case of the AlPO zeolite. FIG. 10 illustrates a scanning electron micrograph of the obtained aluminosilicate zeolite.

The degree of crystallinity of the aluminosilicate zeolite was worked out according to the method described below. The results are given in Table 2.

Degree of Crystallinity

The degree of crystallinity of the obtained aluminosilicate zeolite was calculated on the basis of XRD analysis data. The degree of crystallinity (%) of the sample and of the seed crystals that were used was calculated in accordance with the expression below, by totaling the diffraction peak intensities of Miller indices (1 0 0), (−1 1 1) and (−2 1 0).

Degree of crystallinity (%)=(total value of peak intensity of the sample)/(total value of peak intensity of the seed crystals)×100

A degree of crystallinity of 100% was assigned throughout in cases where the crystallinity of the product was high and the total value of peak intensity exceeded the total value of peak intensity of the seed crystals.

Example 4

An aluminosilicate zeolite of Example 4 was obtained in the same way as in Example 3, but herein the composition of the final starting material mixture was set to
$Al_2O_3:SiO_2:NaOH:TMADAOH:H_2O=0.04:1:0.12:0.15:20$,
the aging time of the final starting material mixture was set to 1 day, and the temperature of the oil bath was set to 190° C. The (volume)/(lateral surface area) of the tubular reactor that was used was 0.076 cm.

Figure 11:
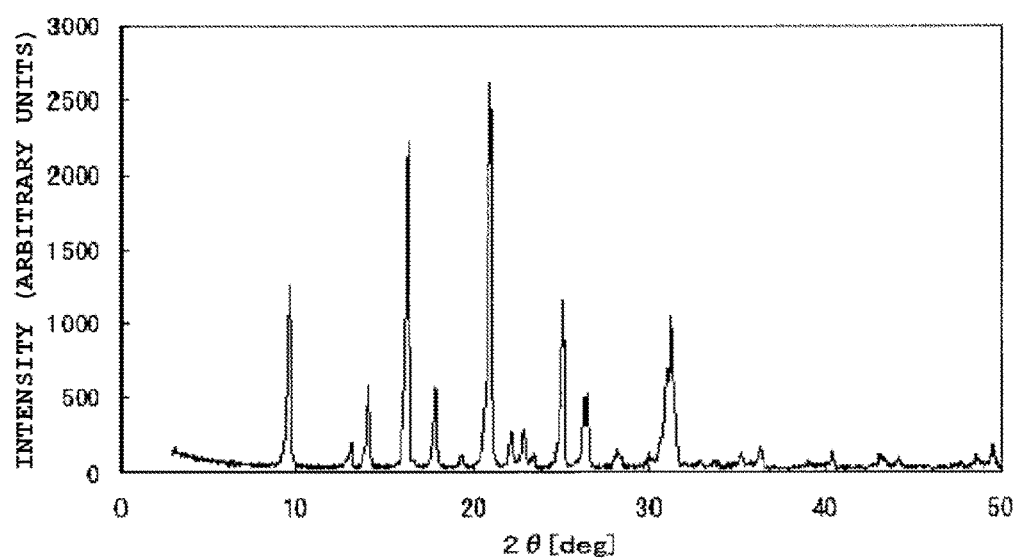
FIG. 11 is an XRD chart of an aluminosilicate zeolite obtained in Example 4.

The obtained aluminosilicate zeolite was found, in XRD analysis, to have a CHA-type structure. FIG. 11 illustrates an XRD chart of the obtained aluminosilicate zeolite.

Figure 12:
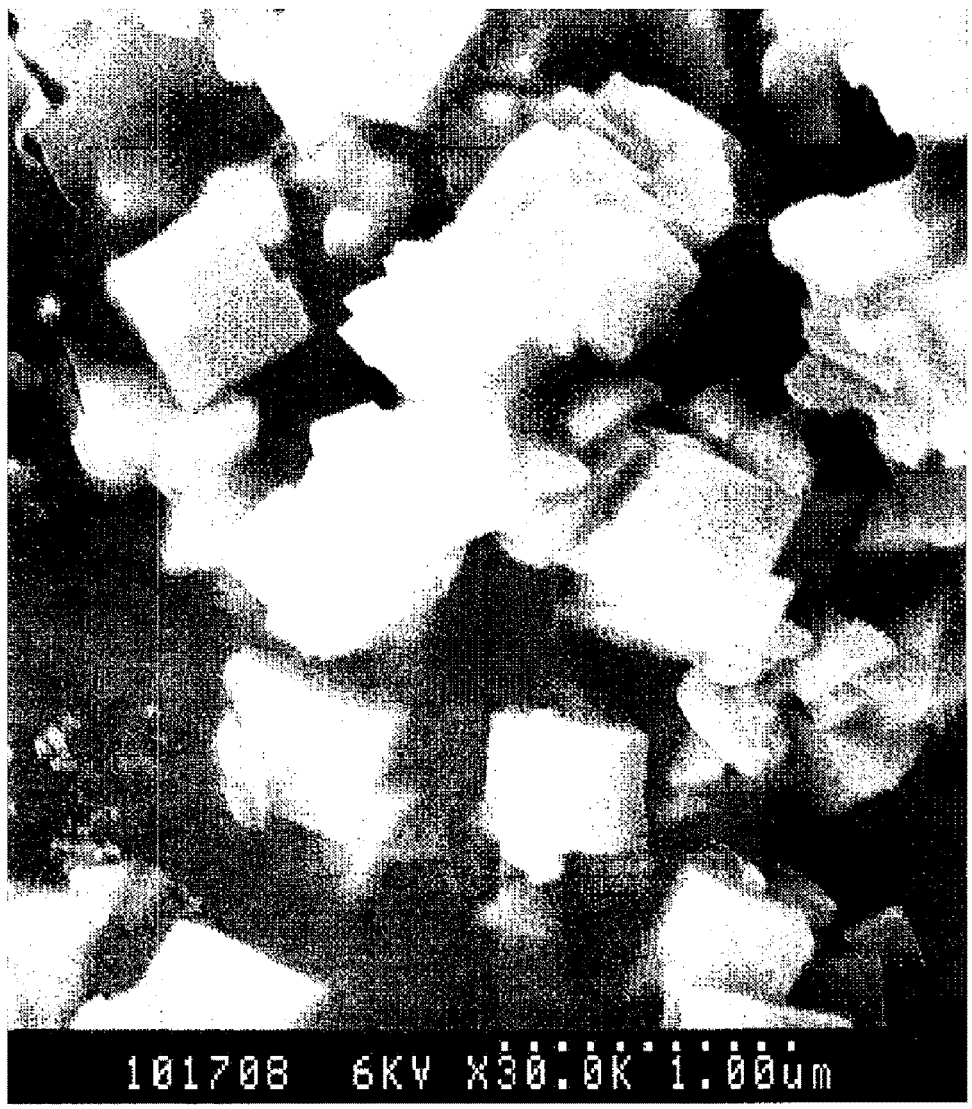
FIG. 12 is a scanning electron micrograph of the aluminosilicate zeolite obtained in Example 4.

The average particle size of the obtained aluminosilicate zeolite was worked out in accordance with the same method as in Example 3. FIG. 12 shows a scanning electron micrograph of the obtained aluminosilicate zeolite.

The degree of crystallinity of the aluminosilicate zeolite was worked out according to the same method as in Example 3. The results are given in Table 2.

Example 5

An aluminosilicate zeolite of Example 5 was obtained in the same way as in Example 4, but herein the aging temperature of the final starting material mixture was set to 70° C., the aging time was set to 40 hours, the temperature of the oil bath was set to 210° C., and the time of heating by the oil bath was set to 15 minutes.

Figure 13:
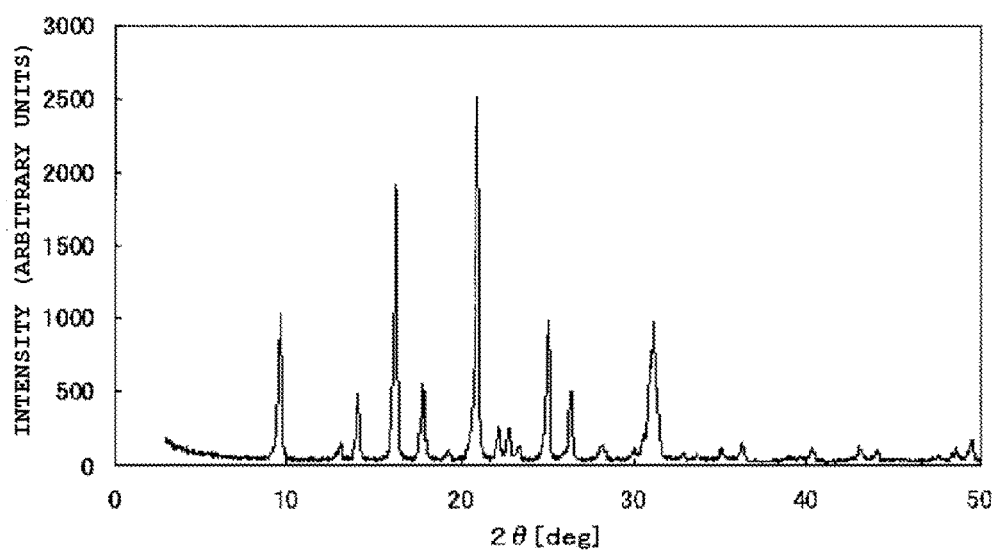
FIG. 13 is an XRD chart of an aluminosilicate zeolite obtained in Example 5.

The obtained aluminosilicate zeolite was found, in XRD analysis, to have a CHA-type structure. FIG. 13 illustrates an XRD chart of the obtained aluminosilicate zeolite.

Figure 14:
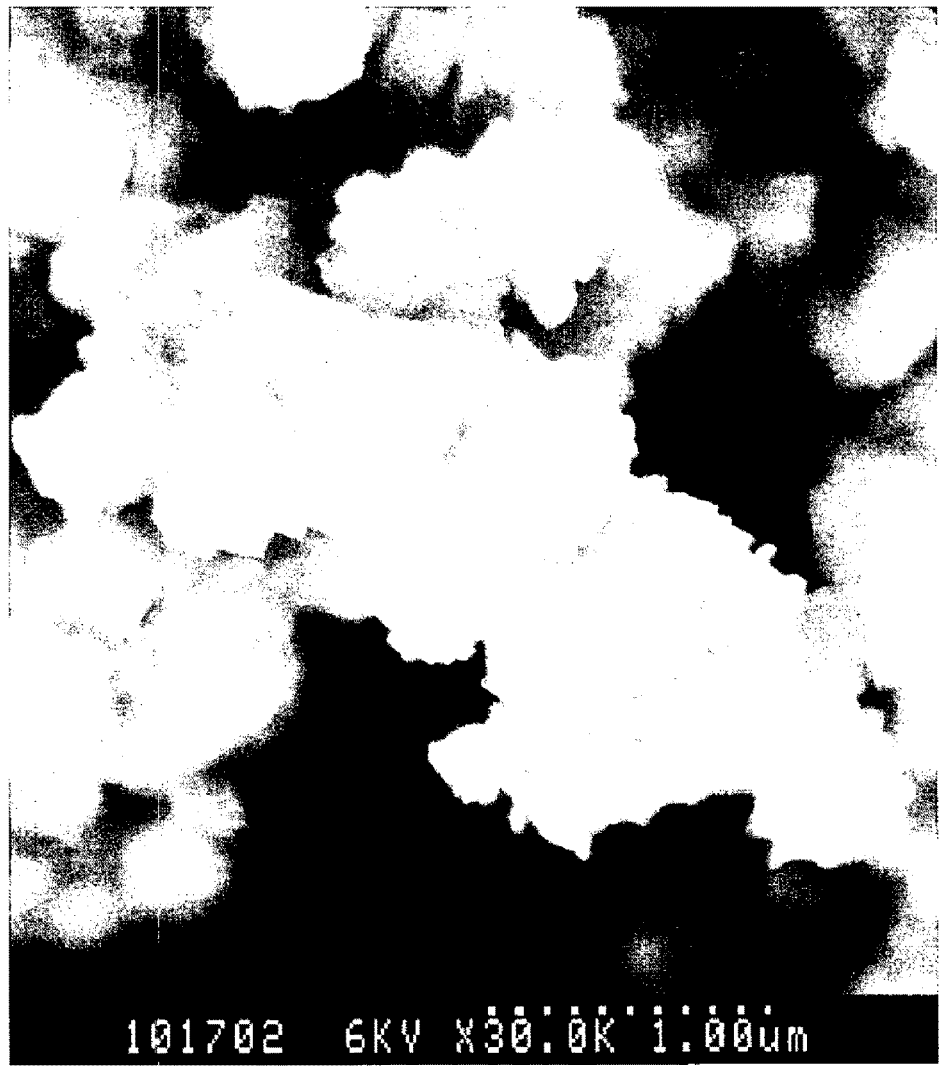
FIG. 14 is a scanning electron micrograph of the aluminosilicate zeolite obtained in Example 5.

The average particle size of the obtained aluminosilicate zeolite was worked out in accordance with the same method as in Example 3. FIG. 14 shows a scanning electron micrograph of the obtained aluminosilicate zeolite.

The degree of crystallinity of the aluminosilicate zeolite was worked out according to the same method as in Example 3. The results are given in Table 2.

Synthesis Example 3

Pulverization of Seed Crystals

Herein, 10 g of the CHA-type aluminosilicate zeolite ($SiO_2/Al_2O_3=23.7$) of Synthesis example 2 were dispersed in 50 g of pure water, and were pulverized for 60 minutes in a bead mill (MiniCer, by Ashizawa Finetech Ltd.) using zirconia beads having a particle size of 300 μm.

A slurry was recovered, was dried in a porcelain dish, and the pulverized CHA-type aluminosilicate zeolite for seed crystals was recovered.

Synthesis Example 4

Preparation of a Supernatant for a Starting Material

Herein, an aqueous solution of N,N,N-trimethyl-1-adamantammonium hydroxide (TMADAOH) (by Sachem Inc. containing 25 wt % of TMADAOH), pure water, sodium hydroxide and aluminum hydroxide (by Wako Pure Chemical Industries, Ltd., containing 65.5 wt % of $Al_2O_3$)) were mixed, and 30 wt % silica sol (LUDOX LS colloidal silica) was added to the obtained starting material mixture. A final starting material mixture having the composition (molar ratio) below was thus prepared.

$Al_2O_3:SiO_2:NaOH:TMADAOH:H_2O=0.04:1:0.12:0.15:20$

The final starting material mixture was subjected to hydrothermal synthesis under autogenous pressure, at 165° C. for 40 hours, in an autoclave. The obtained product slurry was centrifuged, and a supernatant for starting material was recovered.

Example 6

Herein, 2.5 g of the pulverized CHA-type aluminosilicate zeolite for seed crystals of Synthesis example 3 were added to 25 g of the supernatant for starting material of Synthesis example 4, to prepare a final starting material mixture. Thereafter, the final starting material mixture was sealed in the tubular reactor ((volume)/(lateral surface area)=0.076 cm) used in Comparative example 2, and the tubular reactor was heated for 10 minutes in an oil bath heated to 210° C. The obtained product slurry was filtered, washed with water, and dried, to yield an aluminosilicate zeolite.

Figure 15:
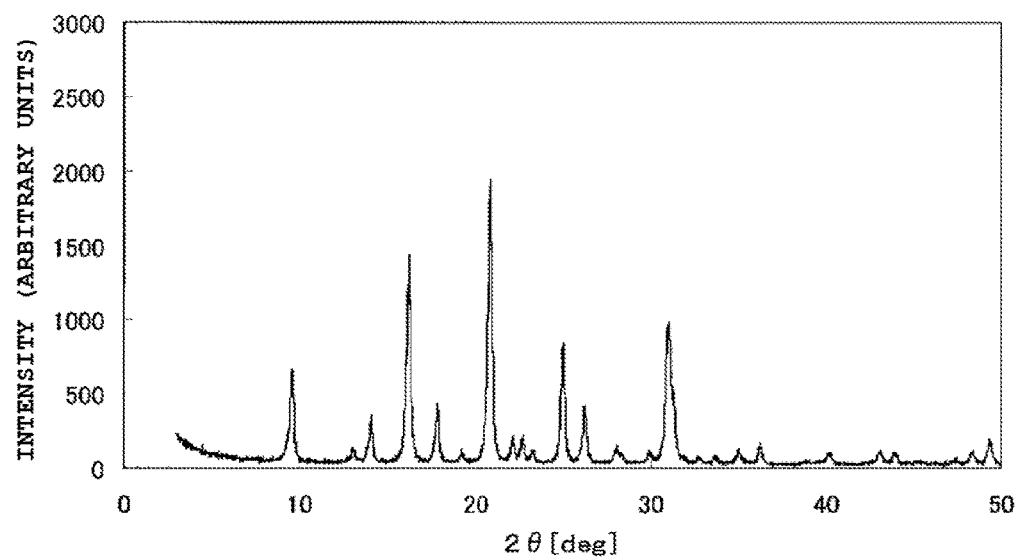
FIG. 15 is an XRD chart of an aluminosilicate zeolite obtained in Example 6.

The obtained aluminosilicate zeolite was found, in XRD analysis, to have a CHA-type structure. FIG. 15 illustrates an XRD chart of the obtained aluminosilicate zeolite.

Figure 16:
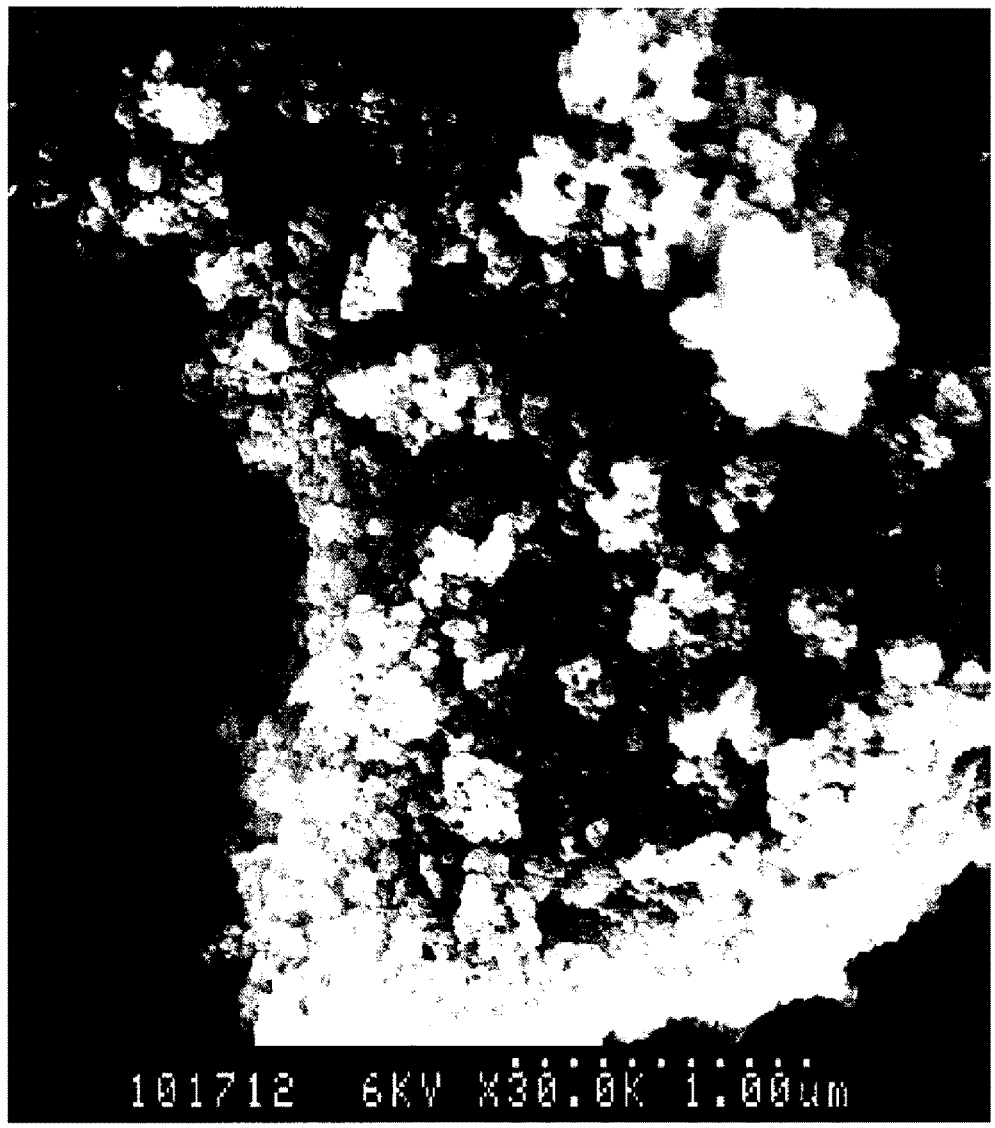
FIG. 16 is a scanning electron micrograph of the aluminosilicate zeolite obtained in Example 6.

The average particle size of the obtained aluminosilicate zeolite was worked out in accordance with the same method as in Example 3. FIG. 16 shows a scanning electron micrograph of the obtained aluminosilicate zeolite.

The degree of crystallinity of the aluminosilicate zeolite was worked out according to the same method as in Example 3. The results are given in Table 2.

Reaction Evaluation

The aluminosilicate zeolite obtained in Example 6 and the CHA-type aluminosilicate zeolite for seed crystals of Synthesis example 2 were fired at 580° C. in the atmosphere and were subjected to ion exchange twice, for 1 hour at 80° C., using a 1M aqueous solution of ammonium nitrate, and were dried thereafter at 100° C., to yield respective $NH_4$-type aluminosilicates. Further firing in the atmosphere at 500° C. yielded respective CHA-type aluminosilicates of H type. The foregoing were used as the catalyst in Example 6 and the catalyst in Synthesis example 2, respectively.

Propylene was produced using the catalyst of Example 6 and the catalyst of Synthesis example 2. A normal-pressure fixed-bed-flow reaction apparatus was used to produce propylene; herein, a quartz-made reaction tube having an inner diameter of 6 mm was packed with a mixture of 100 mg of each catalyst above and 400 mg of quartz sand. Ethylene and nitrogen were supplied to the reactor in such a manner that ethylene was 30 vol % and nitrogen was 70 vol %, with a space velocity of ethylene of 13 mmol/(hr·g-catalyst), and synthesis reaction of propylene was performed at 350° C. and 0.1 MPa. The product was analyzed, by gas chromatography, 0.83 hours, 2.08 hours, 3.33 hours, 4.58 hours and 5.83 hours after the start of the reaction, and the conversion rate of ethylene and the selectivity of propylene were assessed. The results are given in Table 3.

TABLE 2

| | Al source | Seed crystal | Aging conditions Temperature | Time | Oil bath heating conditions Temperature (° C.) | Time (min) | Product | Degree of crystallinity (%) | Average particle size (μm) |
|---|---|---|---|---|---|---|---|---|---|
| Example 3 | Gibbsite | Yes | Room temperature | 4 days | 210 | 60 | CHA | 100 | 0.5 |
| Example 4 | Gibbsite | Yes | Room temperature | 1 day | 190 | 60 | CHA | 100 | 0.5 |
| Example 5 | Gibbsite | Yes | 70° C. | 40 hours | 210 | 15 | CHA | 100 | 0.3 |
| Example 6 | — | Yes | | | 210 | 10 | CHA | 77 | 0.03 |

TABLE 3

| | Reaction time (hr) | Ethylene conversion rate (%) | Propylene selectivity (%) |
|---|---|---|---|
| Catalyst of Ex. 6 | 0.83 | 98.8 | 3.0 |
| | 2.08 | 95.9 | 24.0 |
| | 3.33 | 91.8 | 36.8 |
| | 4.58 | 81.9 | 46.4 |
| | 5.83 | 62.2 | 53.3 |
| Catalyst of Synthesis example. 2 | 0.83 | 99.1 | 2.1 |
| | 2.08 | 96.9 | 18.1 |
| | 3.33 | 92.5 | 37.7 |
| | 4.58 | 83.5 | 48.8 |
| | 5.83 | 65.7 | 57.0 |

Table 2 reveals that the hydrothermal synthesis time can be shortened by adjusting the aging conditions.

Table 3 reveals that the zeolite obtained over a synthesis time of merely 10 minutes according to the present invention exhibited a similar performance, in a catalytic reaction, to that of a zeolite obtained through ordinary autoclave synthesis. The present invention thus shortens the time it takes to produce a zeolite, and reduces significantly zeolite production costs.

Example 7

An aluminosilicate zeolite of Example 7 was obtained in the same way as in Example 3, but herein the composition of the final starting material mixture was set to

$Al_2O_3:SiO_2:NaOH:TMADAOH:H_2O=0.04:1:0.12:0.2:20$, the aging temperature of the final starting material mixture was set to 95° C., the aging time to 2 days, the temperature of the oil bath was set to 210° C., and the time of heating by the oil bath was set to 30 minutes. The (volume)/(lateral surface area) was 0.076 cm.

The obtained aluminosilicate zeolite was found, in XRD analysis, to have a CHA-type structure. The average particle size of the obtained aluminosilicate zeolite was worked out in accordance with the same method as in Example 3.

The degree of crystallinity of the aluminosilicate zeolite was worked out according to the same method as in Example 3. The results are given in Table 4.

Example 8

An aluminosilicate zeolite of Example 8 was obtained in the same way as in Example 7, but herein aluminum hydroxide (Versal B, by UNION SHOWA K.K.) comprising bayerite was used as the aluminum hydroxide, and the time of heating by the oil bath was set to 15 minutes.

The obtained aluminosilicate zeolite was found, in XRD analysis, to have a CHA-type structure. The average particle size of the obtained aluminosilicate zeolite was worked out in accordance with the same method as in Example 3.

The degree of crystallinity of the aluminosilicate zeolite was worked out according to the same method as in Example 3. The results are given in Table 4.

Example 9

Herein, an aqueous solution of N,N,N-trimethyl-1-adamantammonium hydroxide (TMADAOH) (by Sachem Inc. containing 25 wt % of TMADAOH), pure water, sodium hydroxide and aluminum hydroxide (by Wako Pure Chemical Industries, Ltd., containing 65.5 wt % of $Al_2O_3$ (includes gibbsite)) were mixed, and were stirred for 1 hour. Further, 30 wt % silica sol (LUDOX LS colloidal silica) was added to the obtained starting material mixture, with further stirring for 1 hour. Thereafter, the CHA-type aluminosilicate zeolite ($SiO_2/Al_2O_3$=23.7) of Synthesis example 2 was added as seed crystals to a proportion of 10 wt % with respect to the amount of $SiO_2$ in the starting material mixture. A final starting material mixture having the molar composition ratio below was thus prepared.

$Al_2O_3:SiO_2:NaOH:TMADAOH:H_2O=0.04:1:0.12:0.2:20$

The final starting material mixture was aged for 2 days at 95° C., to yield a zeolite precursor gel.

The supernatant for starting material of Synthesis example 4 was used for second-stage supplementation (addition).

A continuous-type tubular reactor was used as the reactor. There was used a stainless steel tube having an inner diameter of 4.4 mm, a wall thickness of 1 mm and a length of 64 cm ((volume)/(lateral surface area)=0.076 cm), structured so as to enable addition of additional starting material after 2.5 minutes (length of 4 cm) following the supply of the mixture. The reactor was heated in an oil bath at 210° C., the seed crystal-containing aqueous gel (zeolite precursor gel) of Example 1 was supplied through the reactor inlet, at a pressure of 2.0 MPa and a flow rate of 0.27 ml/min, using a syringe pump; the supernatant was added, through an additional starting material charging inlet different from the reactor inlet, at a flow rate of 0.65 ml/min, and a product slurry was recovered through the reactor outlet. The retention time of the mixture was 2.5 minutes at the first stage, and 15 minutes after second-stage starting material addition. The obtained product slurry was filtered, washed with water, and dried, to yield an aluminosilicate zeolite.

The obtained aluminosilicate zeolite was found, in XRD analysis, to have a CHA-type structure. The average particle size of the obtained aluminosilicate zeolite was worked out in accordance with the same method as in Example 3.

The degree of crystallinity of the aluminosilicate zeolite was worked out according to the same method as in Example 3. The results are given in Table 4. A CHA-zeolite having a degree of crystallinity in excess of 90% was obtained herein.

Example 10

A precursor of an aluminosilicate zeolite was obtained in the same way as in Example 7, but herein the time of heating by the oil bath was set to 3 minutes. The supernatant for starting material of Synthesis example 4 was added to the precursor, in an amount three-fold that of the precursor, and the whole was stirred at 95° C. for 4 days, to yield an aluminosilicate zeolite. The (volume)/(lateral surface area) of the tubular reactor was 0.076 cm.

The obtained aluminosilicate zeolite was found, in XRD analysis, to have a CHA-type structure. The average particle size of the obtained aluminosilicate zeolite was worked out in accordance with the same method as in Example 3.

The degree of crystallinity of the aluminosilicate zeolite was worked out according to the same method as in Example 3. The results are given in Table 4.

Example 11

An aluminosilicate zeolite of Example 11 was obtained in the same way as in Example 7, but herein the inner diameter of the tubular reactor was set to 10.7 mm and the outer diameter to 12.7 mm. The (volume)/(lateral surface area) of the tubular reactor was 0.225 cm.

The obtained aluminosilicate zeolite was found, in XRD analysis, to have a CHA-type structure.

The degree of crystallinity of the aluminosilicate zeolite was worked out according to the same method as in Example 3. The results are given in Table 4.

Example 12

An aluminosilicate zeolite of Example 12 was obtained in the same way as in Example 7, but herein the inner diameter of the tubular reactor was set to 22.0 mm and the outer diameter to 25.4 mm. The (volume)/(lateral surface area) of the tubular reactor was 0.476 cm.

The obtained aluminosilicate zeolite was found, in XRD analysis, to have a CHA-type structure.

The degree of crystallinity of the aluminosilicate zeolite was worked out according to the same method as in Example 3. The results are given in Table 4.

TABLE 4

| Example | Aluminum source | Aging conditions Temperature | Time | Oil bath heating conditions Temperature (° C.) | Time | Product | Degree of crystallinity (%) | Average particle size (μm) |
|---|---|---|---|---|---|---|---|---|
| 3 | Gibbsite | Room temperature | 4 days | 210 | 60 min | CHA | 100 | 0.5 |
| 4 | Gibbsite | Room temperature | 1 day | 190 | 60 min | CHA | 100 | 0.5 |
| 5 | Gibbsite | 70° C. | 40 hours | 210 | 15 min | CHA | 100 | 0.3 |
| 6 | — | — | — | 210 | 10 min | CHA | 77 | 0.03 |
| 7 | Gibbsite | 95° C. | 2 days | 210 | 30 min | CHA | 91 | 0.4 |
| 8 | Bayerite | 95° C. | 2 days | 210 | 15 min | CHA | 100 | 0.5 |
| 9 | Gibbsite | 95° C. | 2 days | 210 | 17.5 min | CHA | 100 | 0.3 |
| 10 | Gibbsite | 95° C. | 2 days | 210 95 | 3 min 4 days | CHA | 100 | 0.5 |
| 11 | Gibbsite | 95° C. | 2 days | 210 | 30 min | CHA | 77 | — |
| 12 | Gibbsite | 95° C. | 2 days | 210 | 30 min | CHA | 83 | — |

Comparative Example 4

Herein, an aqueous solution of N,N,N-trimethyl-1-adamantammonium hydroxide (TMADAOH) (by Sachem Inc., containing 25 wt % of TMADAOH), pure water, sodium hydroxide, aluminum hydroxide (by Sigma-Aldrich Corporation, containing 53.5 wt % of $Al_2O_3$) and 30 wt % silica sol (LUDOX LS colloidal silica) were mixed and stirred for 2 hours. A final starting material mixture having the molar composition ratio below was thus prepared.

$Al_2O_3$:$SiO_2$:NaOH:TMADAOH:$H_2O$=0.04:1:0.12: 0.2:20.

The final starting material mixture was subjected to hydrothermal synthesis under autogenous pressure, at 160° C. for 5 days, in a 23 ml autoclave. The obtained product slurry was filtered, washed with water, and dried, to yield a CHA-type aluminosilicate zeolite ($SiO_2$/$Al_2O_3$=27.1).

Comparative Example 5

Synthesis was performed in the same way as in Comparative example 4, but herein the composition of the final starting material mixture was set to

$Al_2O_3$:$SiO_2$:NaOH:TMADAOH:$H_2O$=0.04:1:0.12: 0.15:20, the amount of added seed crystals was set to 10%, the hydrothermal synthesis temperature was set to 210° C., and the time to 1 hour.

The obtained product slurry was filtered, washed with water and dried, and the structure of the product, in XRD Analysis, found to be amorphous and it is found that CHA-type aluminosilicate zeolite was not obtained.

Preparation and Evaluation of Cu-Supporting CHA Zeolite Catalysts

The CHA-zeolites obtained in Example 7 and Comparative example 4 were fired at 580° C. in the atmosphere and were subjected to ion exchange twice at 80° C. for 1 hour using a 1M aqueous solution of ammonium nitrate, followed by drying at 100° C., to yield respective NH$_4$-type aluminosilicates. Ion exchange was further performed at room temperature, for 4 hours, using a 6 wt % copper acetate solution, with filtering, cleaning with water and drying, followed by firing at 500° C. for 4 hours, in the atmosphere, to yield respective Cu-supporting catalysts.

The amount of Cu in the Cu-supporting CHA zeolite catalysts was worked out through fluorescence X-ray (XRF) analysis, by creating an XRF calibration curve using values obtained by inductively coupled plasma (ICP) emission spectrometry.

Herein ICP emission spectrometry was performed after heating and dissolving each sample in an aqueous solution of hydrochloric acid.

After tabletting the sample, a Cu content $W_1$ (wt %) was worked out using the above calibration curve by X-ray fluorescence analysis (XRF). The water content $W_{H2O}$ (wt %) of the sample was worked out by thermogravimetric (TG) analysis. The content W (wt %) of Cu in the transition metal-containing zeolite in an anhydrous state was calculated on the basis of the expression below.

$$W=W_1/(1-W_{H2O})$$

The supported amount of Cu as determined according to the above method was 3 wt %.

Evaluation of SCR Catalytic Activity

Each prepared Cu-supporting CHA zeolite sample was press-molded and was thereafter crushed and passed through a sieve, to yield granulates in the range of 0.6 to 1 mm. A normal-pressure fixed bed flow-type reaction tube was packed with 1 ml of the granulated zeolite sample. The zeolite layer was heated while the gas in the composition of Table 5 below was caused to circulate through the zeolite layer at a space velocity of SV=200,000/h. The purification performance (nitrogen oxide removal activity) of each zeolite sample was evaluated at respective temperatures, with a fixed outlet NO concentration, on the basis of the value below:

Test of resistance to high-temperature steam={(inlet NO concentration)−(outlet NO concentration)}/(inlet NO concentration)×100.

TABLE 5

| Gas component | Concentration |
| --- | --- |
| NO | 350 ppm |
| NH$_3$ | 385 ppm |
| O$_2$ | 15 vol % |

TABLE 5-continued

| Gas component | Concentration |
| --- | --- |
| H$_2$O | 5 vol % |
| N$_2$ | Balance of components |

Evaluation of Specific Surface Area Retention Rate after Test of Resistance to High-Temperature Steam A test of resistance to high-temperature steam (hydrothermal durability) was performed that involved treating each prepared zeolite sample (catalyst) by passing high-temperature steam through it, using 10 vol % water steam at 900° C., in an atmosphere at a space velocity SV=3,000/h, for 1 hour. The nitrogen oxide removal activity was evaluated, and an XRD measurement performed, in the same way as before the hydrothermal durability test. The results are given in Table 6.

The degree of crystallinity of the Cu-supporting zeolite catalysts of Example 7 and Comparative example 4 was worked out, as follows, on the basis of obtained XRD patterns. The degree of crystallinity was checked by measuring peaks at a lattice spacing corresponding to the XRD after the hydrothermal durability test, with the sum of peak heights of the respective zeolites before the hydrothermal durability test set to 100%, to assess the extent by which the total values of peak height were maintained. The results revealed that the degree of crystallinity of the zeolite catalyst of the Example 7 was 72%, and the degree of crystallinity of the zeolite catalyst of Comparative example 4 was 18%.

It was found that the zeolite of Comparative example 4 exhibited a large decrease in degree of crystallinity and a large drop in purification performance after the hydrothermal durability test, whereas in Example 7, by contrast, the degree of crystallinity even after hydrothermal durability test was high, of 72%, degradation of the catalyst was largely suppressed, and a superior purification performance was achieved.

It was surprisingly found thus that catalytic activity for exhaust gas treatment in which a purification rate of nitrogen monoxide of 85% or higher can be maintained in a wide range, from 250° C. to 400° C., also after the above-described durability test, is achievable by using a transition metal, in particular copper, supported on a zeolite that is produced in accordance with the production method of the present invention, as a catalyst for exhaust gas treatment. A catalyst obtained by causing a transition metal to be supported on the zeolite of the present invention was thus found to exhibit very good characteristics in particular as an exhaust gas treatment catalyst for diesel engines.

TABLE 6

| Sample | SiO$_2$/Al$_2$O$_3$ | | NO purification rate | | | | | | |
| --- | --- | --- | --- | --- | --- | --- | --- | --- | --- |
| | | | 160° C. | 175° C. | 200° C. | 250° C. | 300° C. | 400° C. | 500° C. |
| Example 7 | 23.4 | Before hydrothermal durability test | 42 | 64 | 86 | 100 | 100 | 98 | 96 |
| | | After hydrothermal durability test | 21 | 34 | 55 | 89 | 93 | 89 | 73 |
| Comparative example 4 | 27.1 | Before hydrothermal durability test | 59 | 78 | 94 | 100 | 100 | 97 | 84 |
| | | After hydrothermal durability test | 8 | 12 | 18 | 48 | 65 | 67 | 49 |

While the invention has been described in detail and with reference to specific embodiments thereof, it will be apparent to one skilled in the art that various changes and modifications can be made therein without departing from the spirit and scope thereof.

INDUSTRIAL APPLICABILITY

The uses of the "zeolite" obtained in accordance with the production method of the present invention are not particularly limited, and the zeolite can be used in a wide variety of applications, for instance in adsorption-type coolers, air conditioners, and various kinds of adsorption element. The "zeolite" obtained in accordance with the production method of the present invention can be used as a catalyst that allows producing propylene by being brought into contact with ethylene and/or ethanol. The "zeolite" can also be suitably used as a catalyst for exhaust gas treatment.

REFERENCE SIGNS LIST 1 aqueous gel tank
2 seed crystal tank
3 heating tank
3A tubular reactor
4 filtration tank
5 heater
6 reflux tank
8 heat medium
20 pipe

The invention claimed is:

1. A method for continuous production of zeolite, wherein a starting material is continuously supplied to a tubular reactor to produce an aluminophosphate zeolite that contains, in a framework structure, at least aluminum atoms and phosphorus atoms or an aluminosilicate zeolite having $5 \leq SiO_2/Al_2O_3 \leq 2000$,
the starting material comprises a zeolite precursor gel,
the tubular reactor is heated using a heat medium,
a ratio (volume)/(lateral surface area) of the volume (inner capacity) to the lateral surface area of the tubular reactor is 0.75 cm or smaller, and
seed crystals and a template are added to the starting material.

2. The method for continuous production of zeolite according to claim 1, wherein after heating of the starting material that is supplied into the tubular reactor, the zeolite precursor gel is further added to an intermediate product in the tubular reactor, so as to come into contact with the starting material after heating.

3. The method for continuous production of zeolite according to claim 1, wherein the zeolite structure of the zeolite, as established by IZA, is AFI.

4. The method for continuous production of zeolite according to claim 1, wherein the zeolite structure of the zeolite, as established by IZA, is CHA.

5. The method for continuous production of zeolite according to claim 1, wherein the starting material is aged for 2 hours or longer.

6. The method for continuous production of zeolite according to claim 1, wherein the framework density of the zeolite ranges from 12.0 T/1,000 Å$^3$ to 17.5 T/1,000 Å$^3$.

7. The method for continuous production of zeolite according to claim 1, wherein the zeolite comprises a transition metal.

8. The method for continuous production of zeolite according to claim 1, wherein the tubular reactor comprises an independent tubular reactor having an openable and closable lid; the starting material is supplied to the tubular reactor and the lid is closed; thereafter, the tubular reactor is heated by being placed in the heat medium; and thereafter, the tubular reactor is retrieved from the heat medium, the lid is opened, and a product is retrieved.

9. The method for continuous production of zeolite according to claim 1, wherein the tubular reactor comprises an independent tubular reactor having an openable and closable lid; the starting material is supplied to the tubular reactor and the lid is closed; thereafter, the tubular reactor is heated by being placed in the heat medium; and thereafter, the tubular reactor is retrieved from the heat medium, the lid is opened, a product is retrieved, and the product is kept at a lower temperature than during reaction.

10. The method for continuous production of zeolite according to claim 1, wherein
in case of production of aluminophosphate zeolite, the zeolite precursor gel contains an aluminum source and a phosphorus source, and
in case of production of aluminosilicate zeolite, the zeolite precursor gel contains an aluminum source and a silicon source.

11. The method for continuous production of zeolite according to claim 1, wherein an average particle size of the seed crystals is in a range of 0.1 μm or greater and 100 μm or smaller.

12. A method for continuous production of zeolite, wherein
a starting material is supplied into a tubular reactor, followed by heating the tubular reactor with a heat medium, to produce an aluminophosphate zeolite that contains, in a framework structure, at least aluminum atoms and phosphorus atoms or an aluminosilicate zeolite having $5 \leq SiO_2/Al_2O_3 \leq 2000$ (molar ratio), wherein a diameter of the tubular reactor is set to be equal to or smaller than 3 cm,
the starting material comprises a zeolite precursor gel,
and seed crystals and a template are added to the starting material.

* * * * *